US011743151B2

(12) United States Patent
Safavi

(10) Patent No.: US 11,743,151 B2
(45) Date of Patent: Aug. 29, 2023

(54) VIRTUAL NETWORK ASSISTANT HAVING PROACTIVE ANALYTICS AND CORRELATION ENGINE USING UNSUPERVISED ML MODEL

(71) Applicant: Juniper Networks, Inc., Sunnyvale, CA (US)

(72) Inventor: Ebrahim Safavi, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/303,222

(22) Filed: May 24, 2021

(65) Prior Publication Data

US 2022/0337495 A1 Oct. 20, 2022

Related U.S. Application Data

(60) Provisional application No. 63/177,253, filed on Apr. 20, 2021.

(51) Int. Cl.
*H04L 43/04* (2022.01)
*G06N 20/00* (2019.01)
*H04L 41/147* (2022.01)

(52) U.S. Cl.
CPC ............ *H04L 43/04* (2013.01); *G06N 20/00* (2019.01); *H04L 41/147* (2013.01)

(58) Field of Classification Search
CPC .............................. H04L 43/04; H04L 41/147
See application file for complete search history.

(56) References Cited

U.S. PATENT DOCUMENTS 5,737,739 A 4/1998 Shirley et al.
7,536,595 B1 5/2009 Hiltunen et al.
(Continued)

FOREIGN PATENT DOCUMENTS

CN 111585781 A 8/2020
EP 3407541 A1 11/2018
(Continued)

OTHER PUBLICATIONS

"Betweenness centrality," Wikipedia, The Free Encyclopedia, last edited on Apr. 18, 2021, Retrieved from: https://web.archive.org/web/20210418161442/https://en.wikipedia.org/wiki/Betweenness_centrality, accessed Nov. 19, 2021, 7 pp.
(Continued)

*Primary Examiner* — Philip C Lee
(74) *Attorney, Agent, or Firm* — Shumaker & Sieffert, P.A.

(57) ABSTRACT

Techniques are described in which a network management system processes network event data received from the AP devices. The NMS is configured to dynamically determine, in real-time, a minimum (MIN) threshold and a maximum (MAX) threshold for expected occurrences for each event type, wherein the MIN thresholds and MAX thresholds define ranges of expected occurrences for the network events of the corresponding event types. The NMS applies an unsupervised machine learning model to the network event data to determine predicted counts of occurrences of the network events for each of the event types and identify, based on the predicted counts of occurrences and the dynamically-determined minimum threshold values and maximum threshold values for each event type, one or more of the network events as indicative of abnormal network behavior.

9 Claims, 15 Drawing Sheets

(56) References Cited

U.S. PATENT DOCUMENTS

| | | |
|---|---|---|
| 8,073,806 B2 | 12/2011 | Garg et al. |
| 8,423,047 B1 | 4/2013 | Zang et al. |
| 9,832,082 B2 | 11/2017 | Dade et al. |
| 10,270,644 B1 | 4/2019 | Valsecchi et al. |
| 10,470,077 B1 | 11/2019 | Kodaypak et al. |
| 10,862,742 B2 | 12/2020 | Singh |
| 10,958,537 B2 | 3/2021 | Safavi |
| 10,958,543 B2 | 3/2021 | Dade et al. |
| 10,958,585 B2 | 3/2021 | Safavi |
| 10,985,969 B2 | 4/2021 | Safavi |
| 11,099,928 B1 | 8/2021 | Vah et al. |
| 2001/0011260 A1 | 8/2001 | Skaanning et al. |
| 2007/0066297 A1 | 3/2007 | Heidari-Bateni |
| 2007/0260911 A1 | 11/2007 | Marilly et al. |
| 2010/0091676 A1 | 4/2010 | Moran et al. |
| 2011/0231704 A1 | 9/2011 | Ge et al. |
| 2014/0172371 A1 | 6/2014 | Zhu et al. |
| 2014/0269269 A1 | 9/2014 | Kovvali et al. |
| 2014/0355454 A1 | 12/2014 | Serban et al. |
| 2016/0162346 A1 | 6/2016 | Kushir et al. |
| 2016/0226740 A1 | 8/2016 | Van Oost et al. |
| 2016/0286409 A1 | 9/2016 | Kravets et al. |
| 2017/0019291 A1 | 1/2017 | Tapia et al. |
| 2017/0126445 A1 | 5/2017 | Hamouda et al. |
| 2017/0364819 A1 | 12/2017 | Yang |
| 2017/0366993 A1 | 12/2017 | Bejerano et al. |
| 2018/0048427 A1 | 2/2018 | Ganjam et al. |
| 2018/0048527 A1 | 2/2018 | Ganjam et al. |
| 2019/0163594 A1 | 5/2019 | Hayden et al. |
| 2019/0215796 A1 | 7/2019 | Poosamani et al. |
| 2019/0347148 A1 | 11/2019 | Gomes Pereira et al. |
| 2019/0356553 A1 | 11/2019 | Mermoud et al. |
| 2019/0373007 A1* | 12/2019 | Salunke ............. G06F 11/3447 |
| 2020/0022016 A1 | 1/2020 | Fenoglio et al. |
| 2020/0267047 A1 | 8/2020 | Safavi |
| 2021/0012115 A1 | 1/2021 | Bodbyl et al. |
| 2021/0034994 A1* | 2/2021 | Stocker .................... G06N 5/04 |
| 2021/0044477 A1 | 2/2021 | Singh |
| 2021/0089927 A9 | 3/2021 | Ryan et al. |
| 2021/0133594 A1 | 5/2021 | Dinh et al. |
| 2021/0160263 A1* | 5/2021 | Jiang .................. H04L 43/087 |
| 2021/0168084 A1 | 6/2021 | Safavi |
| 2021/0176143 A1 | 6/2021 | Dade et al. |
| 2021/0226855 A1 | 7/2021 | Safavi |
| 2021/0273845 A1 | 9/2021 | Safavi |
| 2021/0306201 A1 | 9/2021 | Wang et al. |
| 2021/0374567 A1 | 12/2021 | Bhimireddy et al. |

FOREIGN PATENT DOCUMENTS

| | | |
|---|---|---|
| JP | 2009509412 A | 3/2009 |
| JP | 2011028339 A | 2/2011 |
| JP | 2017509169 A | 3/2014 |
| JP | 2018506245 A | 3/2018 |
| JP | 2018514103 A | 5/2018 |
| JP | 2019536397 A | 12/2019 |
| JP | 2020137126 A | 8/2020 |
| WO | 2016107982 A1 | 7/2016 |
| WO | 2018093916 A1 | 5/2018 |
| WO | 2020150564 A1 | 7/2020 |

OTHER PUBLICATIONS

Extended Search Report from counterpart European Application No. 21182061.8 dated Dec. 16, 2021, 10 pp.

Mist, "Solution Brief; Mist Platform Enabling the AI-Drive Enterprise", Cupertino, CA, USA, Jul. 21, 2020, pp. 1-4, XP055870404, URL: https://www.juniper.net/content/dam/www/assets/solution-briefs/us/en/enabling-the-ai-driven-enterprise.pdf.

U.S. Appl. No. 17/402,215, filed Aug. 13, 2021, naming inventors Wang.

U.S. Appl. No. 17/447,921, filed Sep. 16, 2021, naming inventors Zohoorian et al.

Gencaga, D, et al., "Survey on the Estimation of Mutual Information Methods as a Measure of Dependency Versus Correlation Analysis", AIP Conference Proceedings 1636, 80, (Jan. 2014), 10 pgs.

Safavi, "Building Blocks for AI: Mutual Information and the Pearson Correlation," The New Stack, Retrieved May 21, 2021 from: https://thenewstack.io/mutual-information-pearson-correlationbuilding-blocks-ai/, Mar. 23, 2018, 15 pp.

Safavi, "Baysian Inference: a Key Building Block of AN AI Foundation," The New Stack, Retrieved May 21, 2021 from https://thenewstack.io/bayesian-inference-a-key-building-block-of-an-ai-foundation/, Jul. 9, 2018, 15 pp.

U.S. Appl. No. 16/835,757, filed Mar. 31, 2020, and entitled "Network System Fault Resolution Using a Machine Learning Model".

IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Response to Extended Search Report dated Dec. 16, 2021, from counterpart European Application No. 21182061.8 filed Apr. 24, 2023, 24 pp.

* cited by examiner

| ID | KEY | DISPLAY | PE TYPE | NOTES |
|---|---|---|---|---|
| 1 | CLIENT_AUTH_ASSOCIATION_11R | 11r Association | STA_ASSOC_AUTHO | Authorization_Type determines 11r/OKC |
| 2 | CLIENT_DEAUTHENTICATION | AP Deauthentication | STA_DEAUTH | Client deauthenticated by the AP |
| 3 | MARVIS_EVENT_CLIENT_AUTH_FAILURE | Authorization Failure | STA_AUTHORIZATION_FAILED | Authorization failure due to wrong password |
| 4 | CLIENT_IP_ASSIGNED | DHCP Success | STA_DHCP_ACK | Ack for the IP offered |
| 5 | CLIENT_DNS_OK | DNS Success | STA_DNS_OK | DNS response OK |
| 6 | CLIENT_DEASSOCIATION | Disassociation | STA_DISASSOC_IND | Client disassociated by self or going out of radio coverage |
| 7 | CLIENT_GW_ARP_OK | Gateway ARP Success | ARP_DEFGW_SUCCESS | Gateway is reachable for the client to access internet |
| 8 | CLIENT_AUTH_ASSOCIATION | Authorization & Association | STA_ASSOC_AUTHO | Client associated and authorized |
| 9 | CLIENT_AUTH_REASSOCIATION | Authorization & Reassociation | STA_ASSOC_AUTHO | Client Re-associated and Authorized |
| 10 | MARVIS_DNS_FAILURE | DNS Failure | DNS_SERVER_NOT_RESPONDING | DNS query failed |
| 11 | MARVIS_EVENT_WXLAN_CAPTIVE_PORT_FLOW_REDIRECT | Portal Redirection In Progress | FLOW_REDIRECTED | Redirection success while client connects via guest portal |
| 12 | CLIENT_AUTH_REASSOCIATION_11R | 11r Reassociation | STA_ASSOC_AUTHO | Client Re-associated and Authorized with 802.11R Fast Roaming |
| 13 | MARVIS_EVENT_STA_LEAVING | Client Roamed Away | STA_DISASSOC | Client Roamed Out of the Radio range |
| 14 | MARVIS_EVENT_CLIENT_FBT_FAILURE | 11r FBT Failure | STA_AUTH_IND_FT_FAIL | 11r FBT Failure |
| 15 | HTTP_REDIR_PROCESSED | Portal Redirection Processed | HTTP_REDIR | HTTP_REDIR |

| Startting Time | ELEMENT ID | VALUE | | |
|---|---|---|---|---|
| | | Measured | MAX | MIN |
| t0 | 1 | C1 | C1 | C1 |
| | 2 | C2 | C2 | C2 |
| | ... | ... | ... | ... |
| | ... | ... | ... | ... |
| | n | Cn | Cn | Cn |
| t0+delta | 1 | C1' | C1' | C1 |
| | 2 | C2' | C2 | C2' |
| | ... | ... | ... | ... |
| | ... | ... | ... | ... |
| | n | Cn' | Cn | Cn' |
| t0+2delta | 1 | C1" | C1' | C1" |
| | 2 | C2" | C2 | C2' |
| | ... | ... | ... | ... |
| | ... | ... | ... | ... |
| | n | Cn" | Cn" | Cn |

(1005, 1010, 1015, 1020, 1025 label the columns; 1050, 1055, 1060 label the row groups)

VIRTUAL NETWORK ASSISTANT HAVING PROACTIVE ANALYTICS AND CORRELATION ENGINE USING UNSUPERVISED ML MODEL

This application claims the benefit of U.S. Provisional Patent Application No. 63/177,253, filed 20 Apr. 2021, the entire contents of which is incorporated herein by reference.

FIELD

The disclosure relates generally to computer networks and, more specifically, machine learning-based diagnostics of computer networks and network systems.

BACKGROUND

Wireless access networks make use of network of wireless access points (APs), which are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

Wireless access networks, and computer networks in general, are complex systems which may experience transient and/or permanent issues. Some of the issues may result in noticeable system performance degradation while other issues may resolve themselves without substantially affecting the system level performance as perceived by the users. Some issues may be expected and accepted under a heavy load and as soon as the load subsides, self-healing mechanisms, such as a retry, etc. may cause the issue to go away.

SUMMARY

In general, this disclosure describes techniques that enable a virtual network assistant (VNA) to execute a proactive analytics and correlation engine (PACE) configured to dynamically construct and apply an unsupervised machine learning-based ("ML-based") model for reducing or minimizing resources expended on network diagnostics. As described herein, the techniques enabling the proactive analytics and correlation engine to apply the unsupervised ML-based model to collected network event data to determine whether the network event data represents expected, transient network errors that may self-correct or anomalous behavior that needs to be further analyzed by the virtual network assistant in order to facilitate resolution of underlying faults in the network system.

Moreover, the techniques enable adaptive, closed-loop tuning of the unsupervised ML-based network models by utilizing real-time network data partitioned into sliding windows of time series subgroups for dynamically computing expected ranges (minimum/maximum expected occurrences) for various types of network events over a defined time period. The ML-based models applied by the VNA are trained to predict occurrence levels for the network events based on, as training data, actual network event data augmented with dynamically-determined expected ranges for the different types of network events. The PACE of a network management system (NMS) applies the ML-based model(s) to network event data received from the network system, excluding the most recent observation time frame, and operates to predict occurrence levels expected to be seen during the current observation time frame for the various types of network event along with estimated (predicted) minimum and maximum thresholds for each type of network event, i.e., predicted tolerance ranges for the number of occurrences of each type of network event. Upon determining that the real observation of network event data for the current observation period deviates outside the range set by the minimum and/or maximum thresholds estimated (predicted) by the model for that period, the proactive analytics and correlation engine marks those network events as indicative of anomalous behavior, triggering more detailed root cause analysis.

The techniques of this disclosure provide one or more technical advantages and practical applications. For example, the techniques enable automated virtual network assistants that can determine which network issues should be analyzed and which issues should be treated as transient issues that would be resolved by themselves and therefore ignored without expending additional computation resources.

To ensure that complex computer networks meet the needs of its user community, network administrators seek to quickly resolve any problems that may arise during system operation. On the other hand, analyzing the network and attempting to find the root cause of each and every issue would result in waste of computing resources as the system would over analyze root causes for issues that have been rectified, e.g., by the retry mechanisms, before or immediately after the results of the network analyzer become available.

Further, to achieve certain technical efficiencies, the techniques enable automated virtual network assistants that are based on an unsupervised ML-based model, thereby reducing and/or eliminating the time-consuming effort of tagging each message flow and statistics as a representative of a "good/normal" message flow or a "bad/failure" message flow.

In one example, the disclosure is directed to a method comprising receiving network event data indicative of operational behavior of a network, wherein the network event data defines a series of network events of one or more event types, and dynamically determining, for each event type and based on the network event data, corresponding minimum (MIN) and maximum (MAX) thresholds that define a range of expected occurrences for the network events. The method further comprise constructing an unsupervised machine learning model based on the network event data and the dynamically determined minimum threshold and maximum threshold for each event type without requiring labelling each of the network events of the network event data; and after constructing unsupervised machine learning model, processing additional network event data with the machine learning model to determine, for each of the event types, predicted counts of occurrences of the network events. The method further comprises identifying, based on the predicted counts of occurrences and the dynamically-determined minimum threshold values and maximum threshold values for each event type, one or more of the network events as indicative of abnormal network behavior.

In another example, the disclosure is directed to a network management system (NMS) that manages one or more access point (AP) devices in a wireless network. The NMS includes a memory storing network event data received from the AP devices, wherein the network event data is indicative of operational behavior of the wireless network, and wherein the network event data defines a series of network events of one or more event types over time. The NMS is configured to apply an unsupervised machine learning model to the network event data to determine, for a most recent one of the observation time periods: (i) predicted counts of occurrences of the network events for each of the event types, and (ii) an estimated minimum (MIN) threshold and an estimated maximum (MAX) threshold for each event type, wherein the MIN thresholds and MAX thresholds define ranges of expected occurrences for the network events of the corresponding event types; and identify, based on the estimated minimum threshold values and estimated maximum threshold values and actual network event data for the most recent one of the observation time periods, one or more of the network events as indicative of abnormal network behavior.

BRIEF DESCRIPTION OF DRAWINGS

FIG. 6 illustrates example network events table.

DETAILED DESCRIPTION

Figure 1:
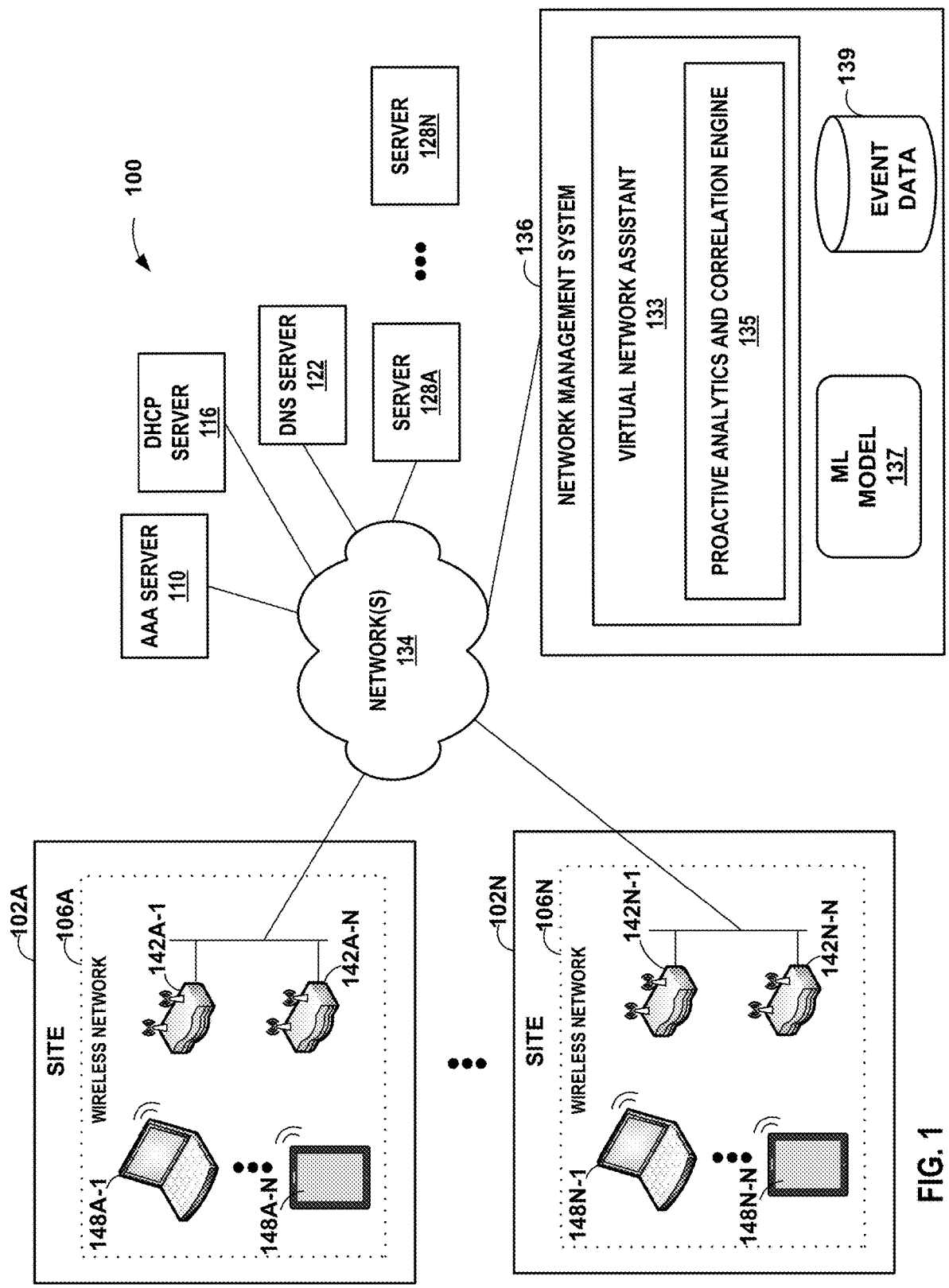
FIG. 1 is a block diagram of an example network system in which a virtual network assistant (VNA) executes a proactive analytics and correlation engine (PACE) configured to dynamically construct and apply an unsupervised ML-based model for network diagnostics.

As described herein, commercial premises, such as offices, hospitals, airports, stadiums, or retail outlets, often install complex wireless network systems, including a network of wireless access points (APs), throughout the premises to provide wireless network services to one or more client devices (or simply, "clients") at the site. The clients may include, for example, smart phones or other mobile devices, Internet of Things (IoT) devices, etc. As the mobile clients move throughout the premises, they may automatically switch from one wireless access point to another, in-range wireless access point, so as to provide the users with seamless network connectivity throughout the premises. In addition, if a particular wireless access point provides poor coverage, client devices may automatically attempt to connect to a different wireless access point having better coverage.

In many examples, wireless network service providers implement systems to monitor and collect one or more network performance metrics to monitor network behavior and measure the performance of a wireless network at a site. For example, service level expectation (SLE) metrics may be used to measure various aspects of wireless network performance. SLE metrics seek to measure and understand network performance from the viewpoint of the end user experience on the network. One example SLE metric is a coverage metric, which tracks the number of user minutes that a client's received signal strength indicator (RSSI) as measured by an access point to which the client is connected is below a configurable threshold. Another example SLE metric is a roaming metric, which tracks a client's percentage of successful roams between two access points that are within prescribed thresholds. Other example SLE metrics may include time to connect, throughput, successful connects, capacity, AP uptime, and/or any other metric that may be indicative of one or more aspects of wireless network performance. The thresholds may be customized and configured by the wireless service provider to define service level expectations at the site.

In accordance with one or more techniques describe herein, a virtual network assistant (VNA) executes a proactive analytics and correlation engine (PACE) configured to dynamically construct and apply an unsupervised ML-based model for network diagnostics, i.e., a machine learning model trained with unlabeled training data. As described herein, the techniques enable the proactive analytics and correlation engine of the virtual network assistant to detect network issues that need to be addressed and facilitate resolution of faults identified in the network system.

As one example, this disclosure describes example embodiments in which a network management system (NMS) of a complex network system (e.g., a wireless network system) implements the proactive analytics and correlation engine to determine whether issues detected in the network system are expected as part of a normal operation of the system, or are atypical. If the NMS determines that the issues are typical under the observed conditions, the NMS may be configured to disregard the issues given that the issues may be resolved by a self-healing mechanism, such as restart or auto-reconfiguration mechanisms. However, if the NMS determines that the issues are not typical under the observed conditions, the NMS may be configured to automatically invoke a more complex and computationally-expensive network analysis to determine a root cause of the issue and automatically perform remediation, such as restarting or re-configuring one or more of the network components to restore a satisfactory system level experience (SLE).

In various examples described herein, the techniques enable construction of an unsupervised ML model based on network event data collected for the network by the NMS. For example, according to the techniques described herein, the NMS may automatically generate and retrain unsupervised ML models for the proactive analytics and correlation engine based on network events extracted from historically observed messages and/or statistics for the network. The proactive analytics and correlation engine of the NMS may then apply the ML model to data streams and/or logs of newly collected data of various network event types (e.g., statistics, messages, SLE metrics or the like, herein referred to as "PACE" event data or event type) to detect whether the currently observed network event data with the stream of incoming data is indicative of a normal operation of the system or whether the incoming network event data is indicative of a non-typical system behavior event or trend corresponding to a malfunctioning network that requires mitigation.

As described, when the application of the ML model by the proactive analytics and correlation engine to the network event data indicates that mitigation is required, the NMS may invoke a more complex root cause network analytics component of the virtual network assistant (VNA) to identify a root cause of the anomalous system behavior and, if possible, trigger automated or semi-automated corrective action. In this way, the proactive analytics and correlation engine (PACE) may construct and apply the ML model based on the particular complex network in which the PACE is deployed as a mechanism for quickly and efficiently determine whether to perform further, resource-intensive analysis on incoming streams of network event data collected (e.g., in real-time) from elements within the complex network system.

Further, along with identifying which issues require attention, some examples described herein may be configured to monitor messages exchanged within the complex network system as well as numerous operational counters, and statistics. During normal operation, the ratios between the values of different counters and statistics can assume values within a specific range of acceptable values, referred to herein as a {Min, Max} range. As described in greater detail below, one technical advantage of the techniques described herein is that the NMS may be configured to construct the unsupervised ML model such that the ML model automatically determines and adjusts the dynamic {Min, Max} ranges of acceptable values for network event data (e.g., particular statistics, counters, metrics and the like) that represents normal operations, thereby achieving improved the accuracy and reliability of the ML model for use in determining whether to trigger deeper root cause analysis on network event data.

FIG. 1 is a diagram of an example network system 100 in which a virtual network assistant (VNA) executes a proactive analytics and correlation engine (PACE) configured to dynamically construct, apply and retrain an unsupervised ML-based model for network diagnostics based on real-time collected network data.

Example network system 100 includes a plurality sites 102A-102N at which a network service provider manages one or more wireless networks 106A-106N, respectively. Although in FIG. 1 each site 102A-102N is shown as including a single wireless network 106A-106N, respectively, in some examples, each site 102A-102N may include multiple wireless networks, and the disclosure is not limited in this respect.

Each site 102A-102N includes a plurality of access points (APs), referred to generally as APs 142. For example, site 102A includes a plurality of APs 142A-1 through 142A-N. Similarly, site 102N includes a plurality of APs 142N-1 through 142N-N. Each AP 142 may be any type of wireless access point, including, but not limited to, a commercial or enterprise AP, a router, or any other device capable of providing wireless network access.

Each site 102A-102N also includes a plurality of client devices, otherwise known as user equipment devices (UEs), referred to generally as UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring or other wearable device. UEs 148 may also include IoT client devices such as printers, security devices, environmental sensors, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 136. As shown in FIG. 1, the various devices and systems of network 100 are coupled together via one or more network(s) 134, e.g., the Internet and/or an enterprise intranet. Each one of the servers 110, 116, 122 and/or 128, APs 142, UEs 148, NMS 136, and any other servers or devices attached to or forming part of network system 100 may include a system log or an error log module wherein each one of these devices records the status of the device including normal operational status and error conditions.

In the example of FIG. 1, NMS 136 is a cloud-based computing platform that manages wireless networks 106A-106N at one or more of sites 102A-102N. As further described herein, NMS 136 provides an integrated suite of management tools and implements various techniques of this disclosure.

In accordance with the techniques described herein, NMS 136 monitors SLE metrics received from wireless networks 106A-106N at each site 102A-102N, respectively, and manages network resources, such as APs 142 at each site, to deliver a high-quality wireless experience to end users, IoT devices and clients at the site. In general, NMS 136 may provide a cloud-based platform for network SLE data acquisition, monitoring, activity logging, reporting, predictive analytics, network anomaly identification, and alert generation.

For example, NMS 136 may include a virtual network assistant (VNA) 133 that implements an event processing platform for providing real-time insights and simplified troubleshooting for IT operations, and that automatically takes corrective action or provides recommendations to proactively address wireless network issues. VNA 133 may, for example, include an event processing platform configured to process hundreds or thousands of concurrent streams of events from sensors and/or agents associated with APs 142 and/or nodes within network 134. For example, VNA 133 of NMS 136 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify administrators of any predicted events, anomalies, trends, and may perform root cause analysis and automated or assisted error remediation.

Further example details of operations implemented by the VNA 133 of NMS 136 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," and U.S. application Ser. No. 16/296,902, filed Mar. 8, 2019, and entitled "Method for Conveying AP Error Codes Over BLE Advertisements," all of which are incorporated herein by reference in their entirety.

In some examples, VNA 133 of NMS 136 may apply machine learning techniques to identify the root cause of error conditions detected or predicted from the streams of event data. If the root cause may be automatically resolved, VNA 133 invokes one or more corrective actions to correct the root cause of the error condition, thus automatically improving the underlying SLE metrics and also automatically improving the user experience. Further example details of root cause analysis and automatic correction techniques performed by NMS 136 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," and U.S. application Ser. No. 16/296,902, filed Mar. 8, 2019, and entitled "Method for Conveying AP Error Codes Over BLE Advertisements," all of which are incorporated herein by reference in their entirety.

In operation, NMS 136 observes, collects and/or receives event data 139, which may take the form of data extracted from messages, counters and statistics, for example. In accordance with one specific implementation, a computing device is part of the network management server 136. In accordance with other implementations, NMS 136 may comprise one or more computing devices, dedicated servers, virtual machines, containers, services or other forms of environments for performing the techniques described herein. Similarly, computational resources and components implementing VNA 133 and PACE 135 may be part of the NMS 136, may execute on other servers or execution environments, or may be distributed to nodes within network 134 (e.g., routers, switches, controllers, gateways and the like).

In accordance with one or more techniques of this disclosure, proactive analytics and correlation engine (PACE) 135 of the virtual network assistant to dynamically construct, train, apply and retrain unsupervised ML model(s) 137 to event data 139 determine whether the collected network event data represents anomalous behavior that needs to be further analyzed by VNA 133 to facilitate root cause analysis and resolution of faults. More specifically, PACE 135 of the NMS applies the ML model(s) 137 to network event data 139 received from the network system 100, excluding network events for the most recent observation time frame, and ML model 137 operates to predict occurrence levels expected to be seen during the current observation time frame for the each of the various types of network event. In addition, based on network event data 139, ML models 137 predict estimated (predicted) minimum and maximum thresholds for each type of network event for the current observation period, i.e., predicted tolerance ranges for the number of occurrences of each type of network event for that period. Upon determining that the real (actual) observation of network event data 139 for the current observation time period deviates beyond the minimum or maximum thresholds predicted by ML model 137 for that period, PACE 135 of VNA 133 marks those network events as indicative of anomalous behavior, triggering VNA 133 to perform root cause analysis on those events.

The techniques of this disclosure provide one or more advantages. For example, the techniques enable automated virtual network assistant 133 to accurately determine which potential network issues should be subjected to deeper root cause analysis, and which issues should be treated as noise or transient issues that may be resolved in normal course and, therefore, can be disregarded. Further, to achieve certain technical efficiencies, the techniques enable automated virtual network assistants that are based on an unsupervised machine learning (ML) model, thereby reducing and/or eliminating the time-consuming effort of tagging each message flow and statistics as a representative of a "good/normal" message flow or a "bad/failure" message flow. Moreover, the techniques facilitate the automatic retraining of the ML-based model so as to adapt to changing network conditions, thereby eliminating false positives that may otherwise arise and result in excessive allocation of resources associated with root cause analysis.

Although the techniques of the present disclosure are described in this example as performed by NMS 136, it shall be understood that techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 136, or may be distributed throughout network 100, and may or may not form a part of NMS 136.

In some examples, network nodes (e.g., routers or switches within network 134) or even access points 142 may be configured to locally construct, train, apply and retrain unsupervised ML model(s) 137 based on locally collected SLE metrics to determine whether the collected network event data should be discarded or whether the data represents anomalous behavior that needs to be forwarded to NMS 136 for further root cause analysis of VNA 350 (FIG. 2) to facilitate identification and resolution of faults.

Figure 2:
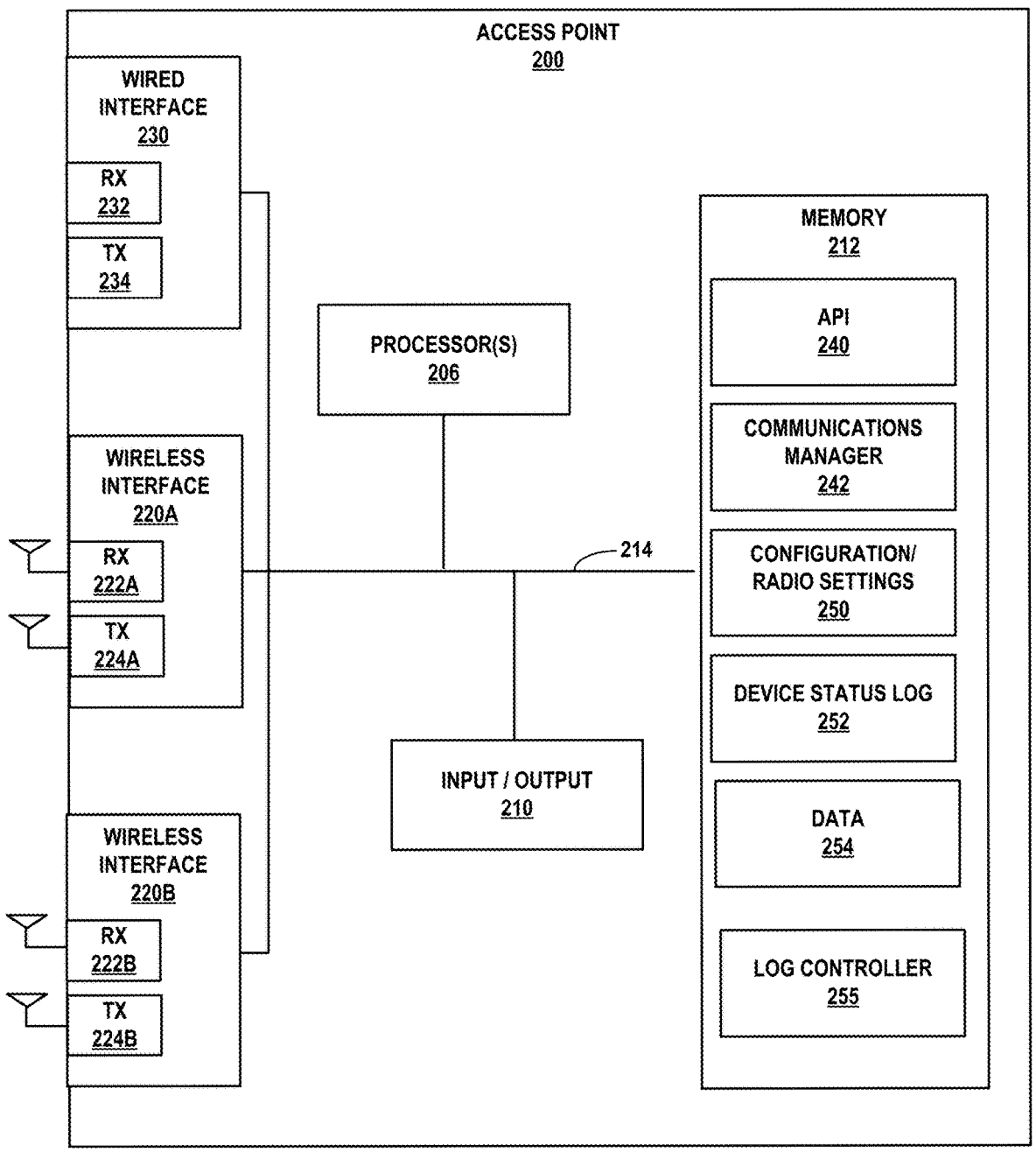
FIG. 2 is a block diagram of an example access point device, in accordance with one or more techniques of this disclosure.

FIG. 2 is a block diagram of an example access point (AP) device 200 configured in accordance with one or more techniques of this disclosure. Example access point 200 shown in FIG. 2 may be used to implement any of APs 142 as shown and described herein with respect to FIG. 1. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to network(s) 134 of FIG. 1. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1. First and second wireless interfaces 220A and 220B further include transmitters 224A and 224B, respectively, each including transmit antennas via which access point 200 may transmit wireless signals to wireless communications devices, such as UEs 148 of FIG. 1. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 stores executable software including an application programming interface (API) 240, a communications manager 242, configuration settings 250, a device status log 252 and data storage 254. Device status log 252 includes a list of events specific to access point 200. The events may include a log of both normal events and error events such as, for example, memory status, reboot events, crash events, Ethernet port status, upgrade failure events, firmware upgrade events, configuration changes, etc., as well as a time and date stamp for each event. Log controller 255 determines a logging level for the device based on instructions from NMS 136. Data 254 may store any data used and/or generated by access point 200, including data collected from UEs 148, such as data used to calculate one or more SLE metrics, that is transmitted by access point 200 for cloud-based management of wireless networks 106A by NMS 136.

Communications manager 242 includes program code that, when executed by processor(s) 206, allow access point 200 to communicate with UEs 148 and/or network(s) 134 via any of interface(s) 230 and/or 220A-220C. Configuration settings 250 include any device settings for access point 200 such as radio settings for each of wireless interface(s) 220A-220C. These settings may be configured manually or may be remotely monitored and managed by NMS 136 to optimize wireless network performance on a periodic (e.g., hourly or daily) basis.

Input/output (I/O) 210 represents physical hardware components that enable interaction with a user, such as buttons, a display and the like. Although not shown, memory 212 typically stores executable software for controlling a user interface with respect to input received via I/O 210.

As described herein, AP device 200 may measure and report SLE-related data (i.e., network event data) from status log 252 to NMS 136. The SLE-related data may include various parameters indicative of the performance and/or status of the wireless network. The parameters may be measured and/or determined by one or more of the UE devices and/or by one or more of the APs 200 in a wireless network. NMS 136 determines one or more SLE metrics and stores the SLE metrics as event data 139 (FIG. 1) based on the SLE-related data received from the APs in a wireless network. In accordance with one or more techniques of this disclosure, PACE 135 of NMS 136 analyzes SLE metrics associated with a wireless network (i.e., event data 139) to dynamically construct, train, apply and retrain unsupervised ML model(s) 137 to determine whether the collected network event data represents anomalous behavior that needs to be further analyzed by VNA 133 to facilitate root cause analysis and resolution of faults.

Figure 3:
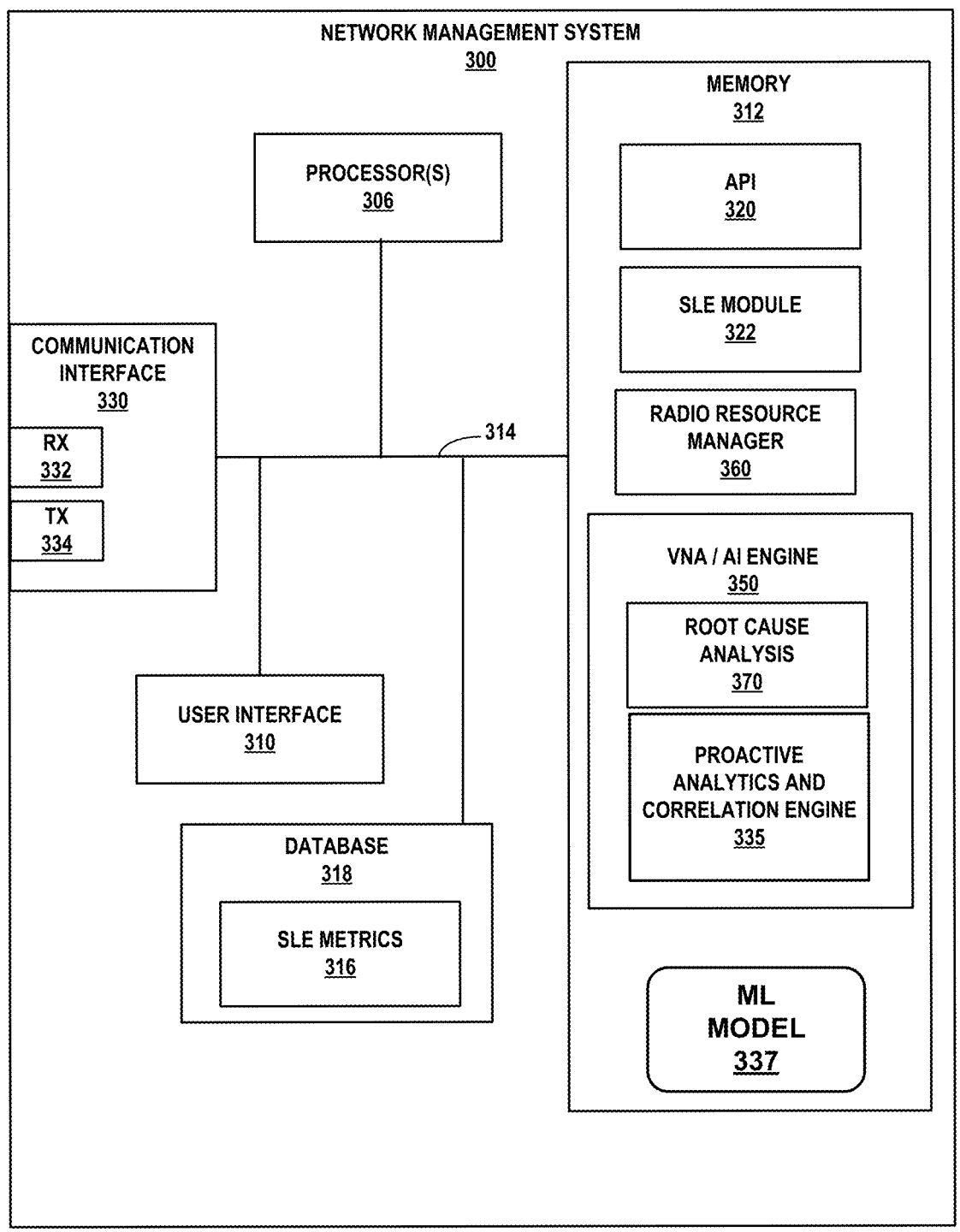
FIG. 3 is a block diagram of an example network management system having a VNA configured to execute a PACE configured to dynamically construct and apply an unsupervised ML-based model for network diagnostics, in accordance with one or more techniques of this disclosure.

FIG. 3 shows an example network management system (NMS) 300 configured in accordance with one or more techniques of this disclosure. NMS 300 may be used to implement, for example, NMS 136 in FIG. 1. In such examples, NMS 300 is responsible for monitoring and management of one or more wireless networks 106A-106N at sites 102A-102N, respectively. In some examples, NMS 300 receives data collected by APs 200 from UEs 148, such as data used to calculate one or more SLE metrics, and analyzes this data for cloud-based management of wireless networks 106A-106N. In some examples, NMS 300 may be part of another server shown in FIG. 1 or a part of any other server.

NMS 300 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of APs 142, servers 110, 116, 122, 128 and/or any other devices or systems forming part of network 100 such as shown in FIG. 1. The data and information received by NMS 300 may include, for example, SLE related or event log data received from access points 200 used by NMS 300 to remotely monitor the performance of wireless networks 106A-106N. NMS may further transmit data via communications interface 330 to any of network devices such as APs 142 at any of network sites 102A-102N to remotely manage wireless networks 106A-106N.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, a radio resource management (RRM) engine 360, and a root cause analysis engine 370. NMS 300 may also include any other programmed modules, software engines and/or interfaces configured for remote monitoring and management of wireless networks 106A-106N, including remote monitoring and management of any of APs 142/200.

SLE module 322 enables set up and tracking of thresholds for SLE metrics for each network 106A-106N. SLE module 322 further analyzes SLE-related data collected by APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. One or more of the SLE metrics may further be aggregated to each AP at a site to gain insight into each APs contribution to wireless network performance at the site. The SLE metrics track whether the service level meets the configured threshold values for each SLE metric. Each metric may further include one or more classifiers. If a metric does not meet the SLE threshold, the failure may be attributed to one of the classifiers to further understand where the failure occurred.

Example SLE metrics and their classifiers that may be determined by NMS 300 are shown in Table 1.

TABLE 1

| | |
|---|---|
| Time to Connect | The number of connections that took longer than a specified threshold to connect to the internet. Classifiers: association, authorization, DHCP, internet services |
| Throughput | The amount of time, that a client's estimated throughput is below a specified threshold. Classifiers: capacity, coverage, device capability, network issues |
| Coverage | The number of user minutes that a client's RSSI as measured by the access point is below a specified threshold. Classifiers: asymmetry downlink, asymmetry uplink, Wi-Fi interference |

TABLE 1-continued

| | |
|---|---|
| Capacity | The number of user minutes that a client experiences "poor" (insufficient) capacity. Classifiers: AP load, non-Wi-Fi interference, Wi-Fi interference |
| Roaming | The percentage of successful roams between 2 access points for clients that are within a specified target time that it takes for a client to roam. Classifiers: no fast roam, suboptimal 11r roam, suboptimal okc roam, slow roam |
| Successful Connects | The percentage of successful Authorization, Association, DHCP, ARP, and DNS attempts during an initial connection by a client to the network, when a client roams from one AP to the next, and on an on-going basis. Classifiers: association, authorization, DHCP |
| AP Health | This may be calculated based on AP Reboots, AP Unreachable events, and Site Down events. Classifiers: AP re-boot, AP Unreachable, Site Down |

RRM engine 360 monitors one or more metrics for each site 106A-106N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 106 with an aim to improve the coverage and capacity SLE metrics and thus to provide an improved wireless experience for the user.

VNA/AI engine 350 analyzes data received from APs 142/200 as well as its own data to identify when undesired to abnormal states are encountered in one of wireless networks 106A-106N. For example, VNA/AI engine 350 may use root cause analysis module 370 to identify the root cause of any undesired or abnormal states. In some examples, root cause analysis module 370 utilizes artificial intelligence-based techniques to help identify the root cause of any poor SLE metric(s) at one or more of wireless network 106A-106N. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoke downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

In accordance with one or more techniques of this disclosure, PACE 335 of the virtual network assistant to dynamically construct, train, apply and retrain unsupervised ML model(s) 337 to event data (SLE metrics 316) to determine whether the collected network event data represents anomalous behavior that needs to be further analyzed by root cause analysis 370 of VNA 350 to facilitate identification and resolution of faults.

The techniques of this disclosure provide one or more advantages. For example, the techniques enable automated virtual network assistant 350 to accurately determine which potential network issues should be subjected to deeper root cause analysis 370, and which issues should be treated as noise or transient issues that may be resolved in normal course and, therefore, can be disregarded. Further, to achieve certain technical efficiencies, the techniques enable automated virtual network assistants that are based on an unsupervised machine learning (ML) model 337, thereby reducing and/or eliminating the time-consuming effort of tagging each message flow and statistics as a representative of a "good/normal" message flow or a "bad/failure" message flow. Moreover, the techniques facilitate the automatic retraining of the ML-based model so as to adapt to changing network conditions, thereby eliminating false positives that may otherwise arise and result in excessive allocation of resources associated with root cause analysis.

Figure 4:
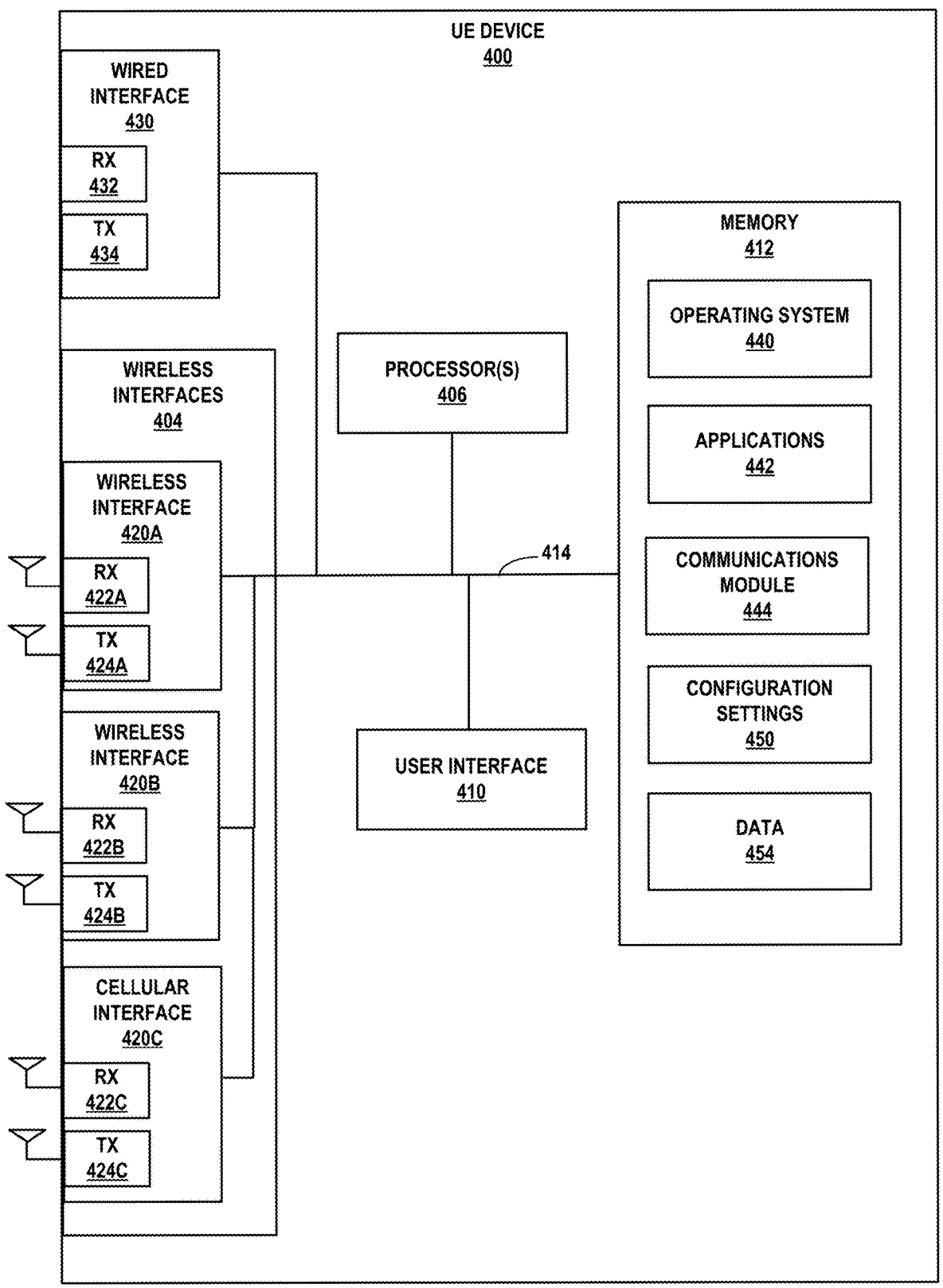
FIG. 4 is a block diagram of an example network node, such as a router or switch, in accordance with one or more techniques of this disclosure.

FIG. 4 shows an example user equipment (UE) device 400. Example UE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

In accordance with one or more techniques of this disclosure, one or more SLE parameter values (that is, data used by NMS 136 to calculate one or more SLE metrics) are received from each UE 400 in a wireless network. For example, NMS 136 receives one or more SLE parameter values from UEs 148 in networks 106A-106N of FIG. 1. In some examples, NMS 136 receives the SLE parameter values from UEs 148 on a continuous basis, and NMS may calculate one or more SLE metrics for each UE on a periodic basis as defined by a first predetermined period of time (e.g., every 10 minutes or other predetermined time period).

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1, AP 200 of FIG. 2, other UEs 138 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage 454. Data storage 454 may include, for example, a status/error log including a list of events and or SLE-related data specific to UE 400. The events may include a log of both normal events and error events according to a logging level based on instructions from the network management system. Data storage 454 may store any data used and/or generated by UE 400, such as data used to calculate one or more SLE metrics, that is collected by UE 400 and transmitted to any of APs 138 in a wireless network 106 for further transmission to NMS 136.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Figure 5:
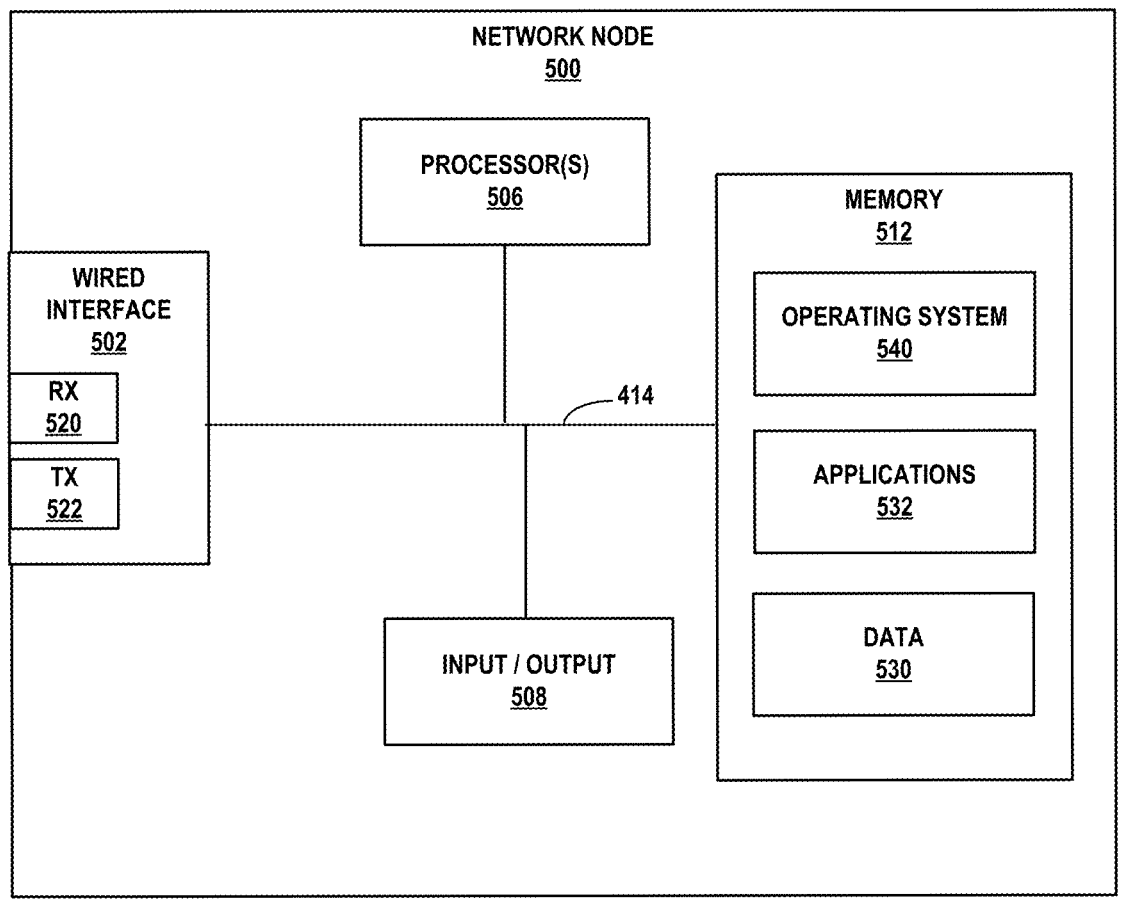
FIG. 5 is a block diagram of an example user equipment device, in accordance with one or more techniques of this disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server, DHCP server, DNS server, VNA, Web server, etc., or a network device such as, e.g., routers, switches or the like. In some embodiments, network node 400 of FIG. 4 is server 110, 116, 122, 128, of FIG. 1 or routers/switches of network 134 of FIG. 1.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network. Though only one interface is shown by way of example, those skilled in the art should recognize that network nodes may, and usually do, have multiple communication interfaces. Communications interface 502 includes a receiver 520 via which the network node 500, e.g. a server, can receive data and information, e.g., including operation related information, e.g., registration request, AAA services, DHCP requests, Simple Notification Service (SNS) look-ups, and Web page requests. Communications interface 502 includes a transmitter 522, via which the network node 500, e.g., a server, can send data and information, e.g., including configuration information, authentication information, web page data, etc.

Memory 512 stores executable software applications 532, operating system 540 and data/information 530. Data 530 includes system log and/or error log that stores SLE metrics (event data) for node 500 and/or other devices, such as wireless access points, based on a logging level according to instructions from the network management system. Network node 500 may, in some examples, forward the SLE metrics to a network management system (e.g., NMS 136 of FIG. 1) for analysis as described herein. Alternatively, or in addition, network node 500 may provide a platform for execution of PACE 135 to locally construct, train, apply and retrain unsupervised ML model(s) 337 based on data 530 (SLE metrics) to determine whether the collected network event data should be discarded or whether the data represents anomalous behavior that needs to be forwarded to NMS 136 for further root cause analysis of VNA 350 (FIG. 2) to facilitate identification and resolution of faults.

PACE Events

FIG. 6 is a simplified example table 600 of network events collected and used by a PACE, such as PACE 135, in accordance with the techniques described herein. NMS 136 extracts the events from messages received from access points 142 and/or network nodes, such as routers and switches of network 134. Messages informing the NMS 136 regarding an occurrence of a network event may arrive any time after a network event has been experienced by any component of the network, such as network events related to DNS, DHCP, ARP, etc. activities.

Example messages 600 includes an ID which includes an index number for each network event listed in a row of column 620. The simplified table includes 15 network events but the number of events can be much larger with the number of events depending on the number of events included in a training database. Column 610 provides indexes for the events which may be used to simplify referencing to a specific event. Column 630 of the event dictionary table 600 provides a text that may be displayed to facilitate servicing of the system by an IT technician or a system administer.

Column 640 includes data specifying the type of network event and helps categorizing the events into specific groups of related events, and column 650 provides more detailed textual description of the nature of each network event. Information from the notes column 650 may be useful for a technician who may need to service the system but is not used by the automated system described in greater details below.

Estimating the Expected Variability and Boundaries of Network Event Counters

Figure 7:
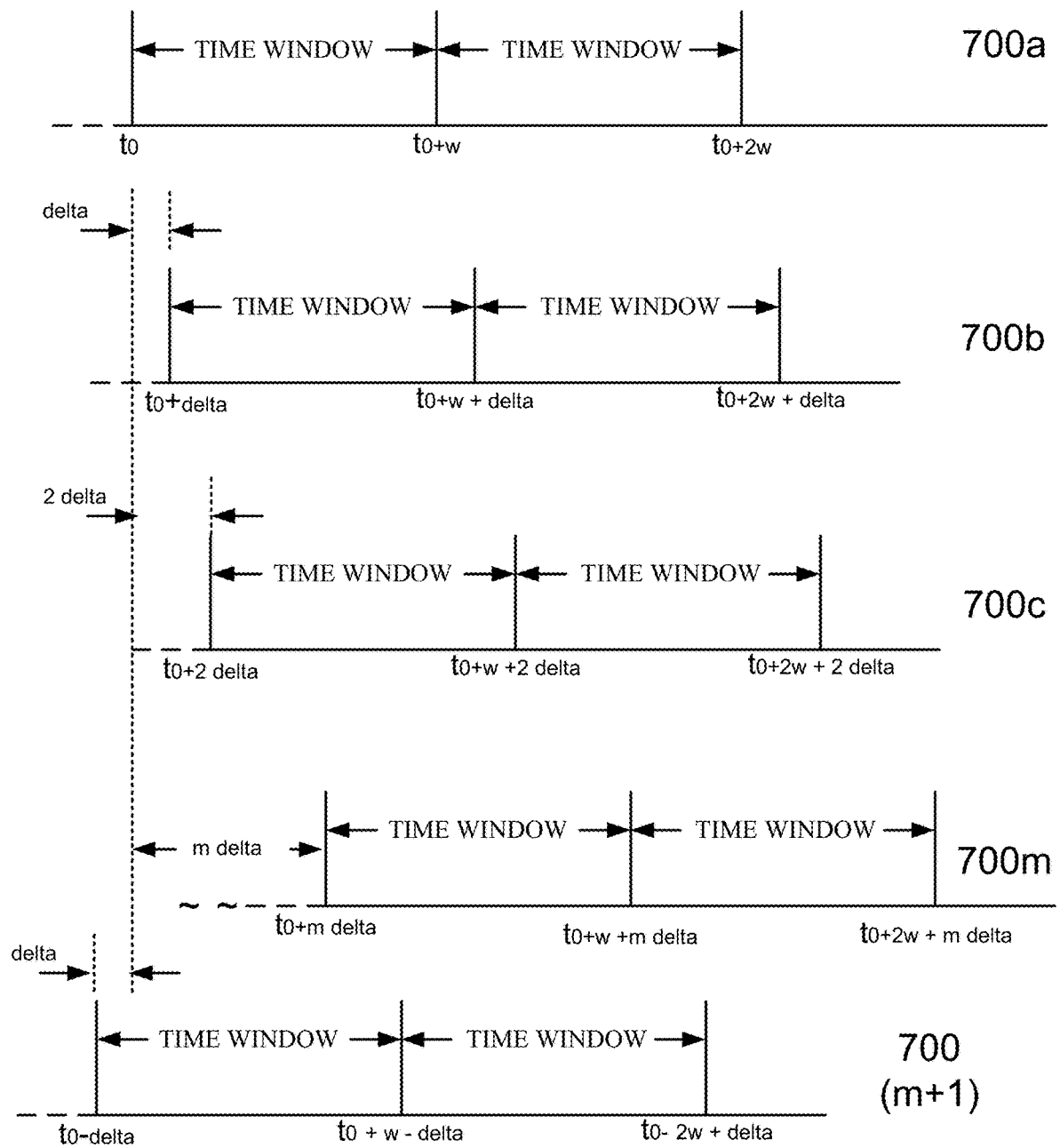
FIG. 7 illustrates time windows used to measure the variability associated with each network event counters.

FIG. 7 illustrates exemplary time windows 700A, 700B, 700C to 700m+1 used by PACE 135 to dynamically measure the variability associated with counter values for each different type of network event in real-time, i.e., as event data 139 is collected within network system 100. In this example, a first time window of time window series 700A begins at time to and lasts for duration of w seconds. Similarly, a consecutive time window starts at time $t_{0+w}$ and lasts until time $t_{0+2w}$. During each time window, PACE 135 monitors the arriving network events and maintains counts of the number of occurrences for each type of network event during the particular time window. In some examples, PACE 135 creates and stores the counts as a vector of network events (referred to herein as a vector of PACE events or VPE):

$$VPE(t)=[c_1,c_2,c_3,\ldots c_n] \qquad EQ.1$$

Where:
VPE(t)—vector of network events at time t,
$c_i$—number of first network events i which occurred during said time window t,
t—time marker indicative of the start of the time window
i—index of network event such as index of column 610 of FIG. 6,
n—number of network events.

As explained below in greater detail with reference to flowchart 800 of FIG. 8, since the time origin to is chosen arbitrarily, PACE 135 examines and determines what would have been the value of each one of the counters $c_1$ through $c_n$ had the origin of the time window started at slightly different time. In this way, PACE 135 dynamically measures variability of counter values for a time series of event data, e.g., real-time streams of event data received from APs and network nodes of network system 100, using a sliding window of overlapping time window series 700a-700m offset by a time delta.

Figure 8:
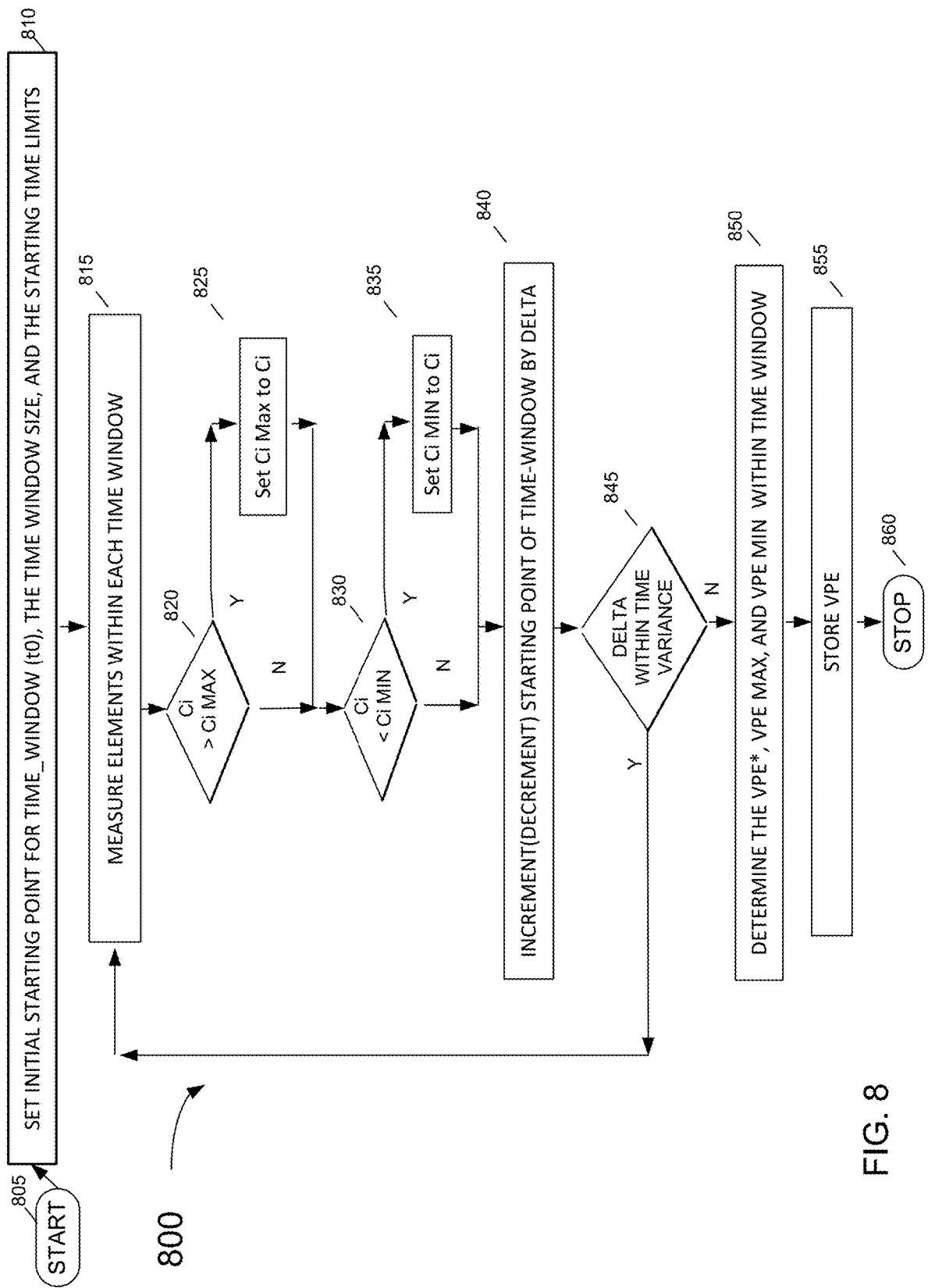
FIG. 8 illustrates a flowchart of a process for estimating the expected variability and boundaries of network event counters.

FIG. 8 is a flowchart illustrating an example process 800 performed by PACE 135 for estimating the expected variability and acceptable boundaries of network event counters. The specific values of each event counter parameter/element depend on the specific starting point of time to wherein the time-window is set to start. For example, referring to FIG. 7, each one of the event counters used to establish the vector of network events described in EQ. 1 above. Event counters measured by PACE 135 within time-windows of time window series 700a would be different than the event counters measured within time-windows of time window series 700b, which starts delta seconds later, or within time-windows of time window series 700(m+1) which starts delta seconds earlier.

Process 800 performed by PACE 135 for processing event data 139 starts at operation 805 and continues to operation 810, where PACE 135 determines initial time-window parameters such as starting point to, window duration (e.g., 2 weeks), a starting time increment delta (e.g., 5 minutes), as well as the range (limits) of varying the starting time $t_0$. PACE 135 may determine these values based on configuration data provided by a system administrator, data scientist or other user. Though the process below is described in reference to a specific element $c_i$ of the VPE, it should be understood that PACE 135 performs the same process for each one of the n elements of the PACE vector, i.e., for each counter.

Figure 9:
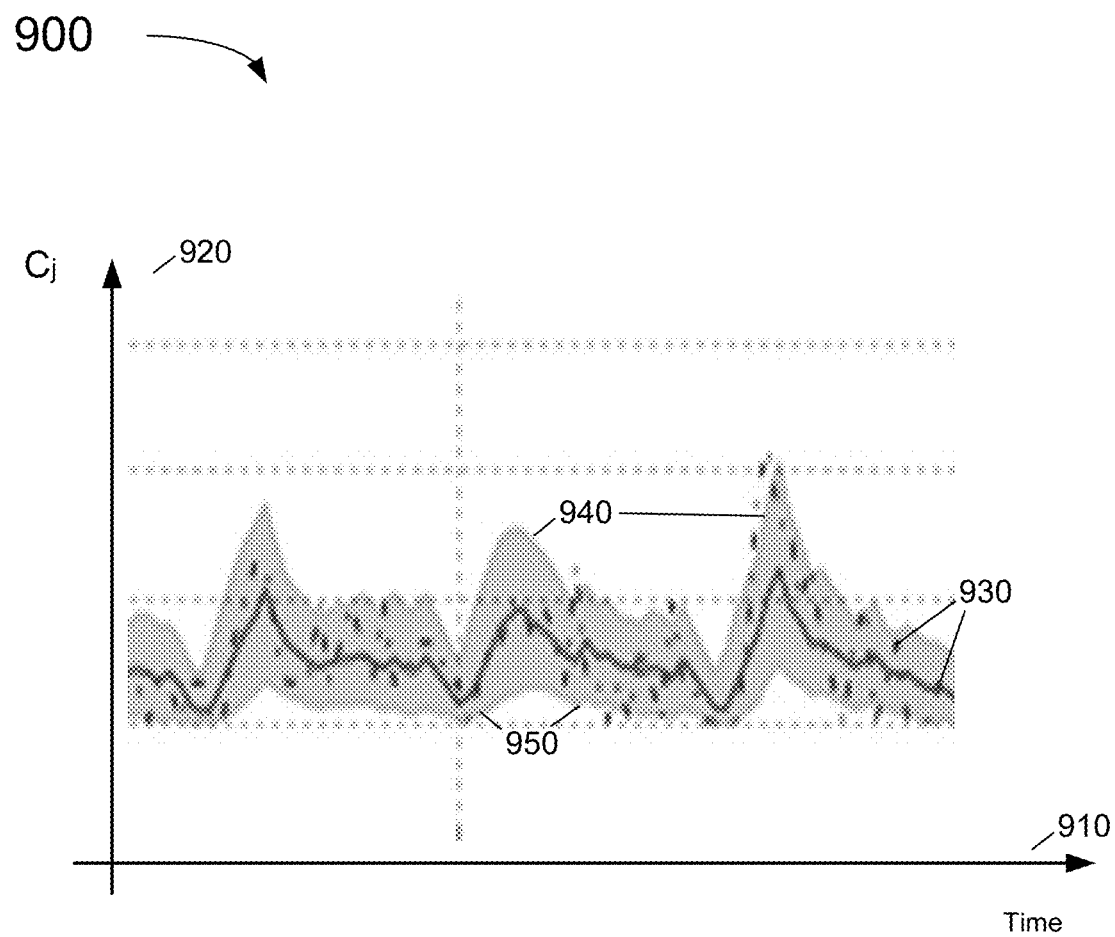
FIG. 9 illustrates a time series of the VPE counters' values including the dynamic boundaries.

Once PACE 135 determines the initial parameters in operation 810, PACE 135 proceeds to step 815 where the system measures, accumulates and stores totals for the network event counters for each time window in the time window series. An example for such multivariate time-series of data generated and stored by PACE 135 is illustrated in FIG. 9. In some examples, the measured and observed PACE counters are stored in a table, such as the one illustrated in FIG. 10.

Figure 10:
FIG. 10 illustrates a time series of the VPE counters' values including the determination of the dynamic boundaries.

In the first iteration through step 820, which is illustrated by rows 1050 in FIG. 10, only the initial values of table 10 exist and as such PACE 135 sets the measured parameters $c_i$, illustrated by column 1015, to be also $c_i$ Max, illustrated by column 1020, in step 825 to the values of the corresponding measured VPE values of each $c_i$ within the corresponding time window. Similarly, in the first iteration through step 830, only the initial parameters of $c_i$ exist and as such PACE 135 sets Ci Min, illustrated in column 1025, in operation 835 to the values of the corresponding measured VPE parameters $c_i$ within the corresponding time window $t_0$, illustrated by rows 1050. These initial parameter assignments are shown in FIG. 10.

In accordance with an example implementation, the VPE counter values obtained when the origin of the time window is at t0, are used as $C_i^*$ and the VPE vector constructed from these counter values is referred to as VPE*.

PACE 135 proceeds to step 840 where a new starting time point is set either by incrementing or decrementing the starting time point by delta seconds. In operation 845, PACE 135 determines whether the new starting time of the window is still within the limits for varying the starting time of the time windows. Or in other words, whether the time origin is still within the time segment [$t_0$–m delta, . . . , to, . . . $t_0$+m delta]. If it is, PACE 135 loops back to operation 815 and measures the VPE value in each new time window that has a different starting point than the previous time window. An example of these measurements is illustrated in FIG. 10. rows 1055, the measured values or count of each element of the VPE are [$c_1'$, $c_2'$, . . . $c_n'$]. Assuming that $c_1' > c_1$, PACE 135 sets $c_1'$ to be $c_1$ max, assuming that $c_2 > c_2'$, the method sets $c_2'$ to be $c_2$ min, and assuming that that $c_n' >$, $c_1$ the method sets $c_n'$ to be $c_n$ max. Similarly for the time window illustrated by rows 1060, assuming that $c_1'' > c_1'$, PACE 135 sets $c_1''$ to be $c_1$ max, assuming that $c_2''$ falls between $c_2$ and $c_2'$, PACE 135 does not change the entries in the table, and assuming that that $c_n'' < c_n$, PACE 135 sets $c_n''$ to be $c_1$ min.

PACE 135 continues to iterate through operations 815, 820, 825, 840 and 845 until the shift of the starting point of the time windows covers the predetermined time period. This time duration is based on the threshold for varying the starting time of the time windows which was set in the initial operation 810.

Once the whole range of starting time to is covered, PACE 135 moves to operation 850. For example, FIG. 9 shows that the time period covers times up to $t_{0+m\ delta}$ where m is a predetermined number. Similar time period can be used to shift the starting time backwards up to td (not shown in the figure). In step 850, PACE 135 determines the variability of counts for each network event type (i.e. SLE parameter), specifically, determines the value of the corresponding ci Max and ci Min for each VPE counters in each time-window based on the values set in previous steps.

PACE 135 proceeds to operation 855, wherein the VPE*, VPE Max, and VPE Min are stored, thereby augmenting the unlabeled network event data 139 with determined time-based variability for network events to produce augmented training data for use in training ML model 137 for predicting estimated counts of network events along with estimated minimum and maximum thresholds defining a corresponding range for the expected count of each network type.

In one example implementation, PACE 135 ends at operation 860. In accordance with another example implementation, PACE 135 may be configured to repeat method 800 every W seconds, and continuously produces a time series of the corresponding vectors VPE*, VPE Min, and VPE Max for use in adaptively re-constructing ML model 137 in view of real-time network event data.

FIG. 9 illustrates a time series of the VPE counters' values obtained by PACE 135 according to process 800 discussed above. In this example, x axis 910 provides the time and in one example implementation to the time to for the corresponding VPE counter values. The y axis 920 provides the value of a specific $c_j$ values. For sake of simplicity only a value of a single counter $c_j$ is provided. Specifically, for each origin time along the x axis 910, the figure illustrates the values of VPE* 930 and dynamically determined VPE Max 940, and VPE Min 950.

Training the System Behavioral Model

Figure 11:
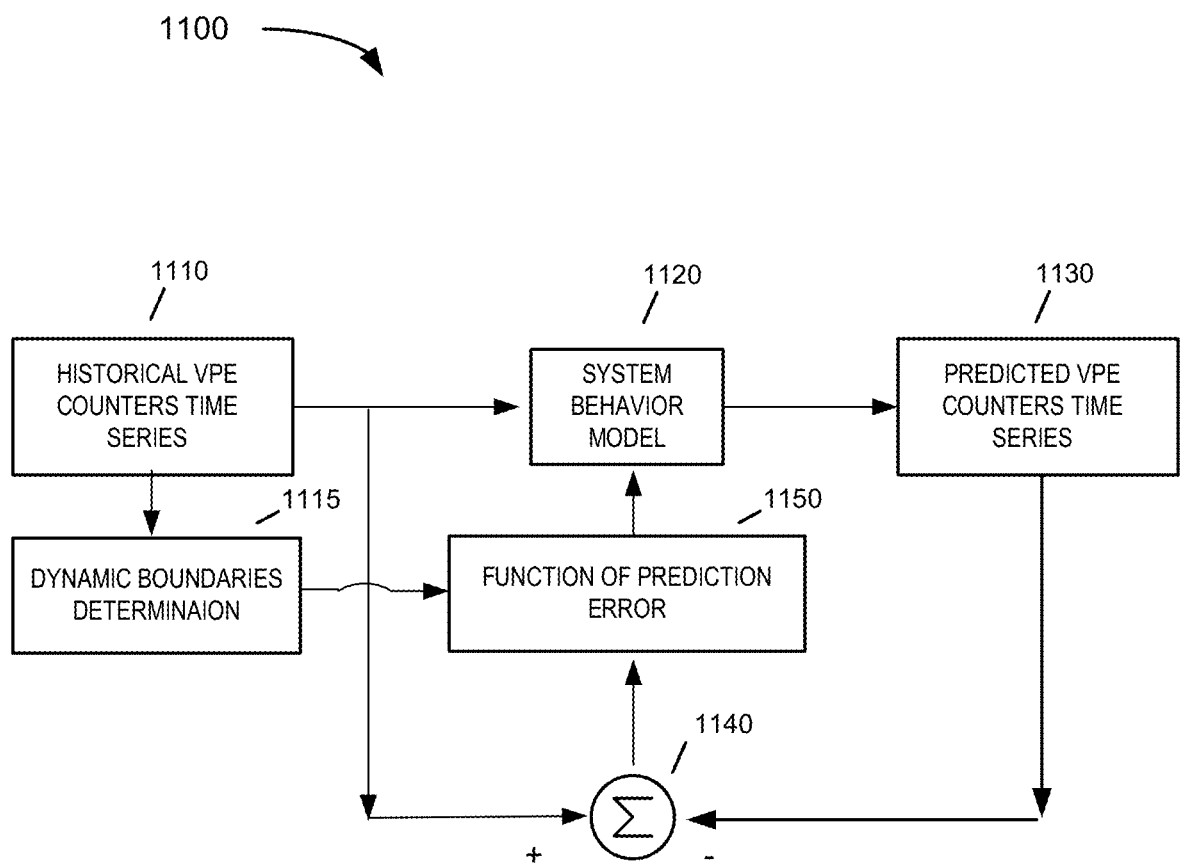
FIG. 11 shows an example diagram showing the training of a behavioral model of the system.

FIG. 11 is a block diagram of components 1100 of PACE 135 operating to train behavioral ML model 137. Time series of the historical values of the VPE counters 1110 generated by PACE 135, as described above, is used as an input into dynamic boundaries determination module 1115. As explained above in greater detail, each vector of PACE counters generated by PACE 135 corresponds to a set of sliding time windows separated by w seconds. At the time, the dynamic boundaries determination module outputs the values $C_j^*$, $C_j$ Max, and $C_j$ Min. (The value of $C_j^*$ is actually the same as $C_j$). As explained below with reference to FIG. 12, these values are used as an input to module 1150 to derive the function of the VPE prediction error.

In operation, PACE 135 applies system behavioral model 1120 (i.e., ML model 137) to the received event data 139 (referred to as historical VPE counters 1110), which produces as output 1130 an estimated (e.g. "predicted") value for the current value of VPE:

$$[VPE_{t-k}, VPE_{t-k+1}, \ldots VPE_{t-1}] \rightarrow \text{behavioral model} \rightarrow \text{Predicted } VPE_t \qquad \text{EQ. 2}$$

where

[$VPE_{t-k}$, $VPE_{t-k+1}$, . . . $VPE_t$] is a time series of the historical VPE counters' values, behavioral model is module 1120 of FIG. 11, and Predicted $VPE_t$ is predicted value of VPE counter based on the historical values of the VPE counters.

In some example implementations, the dimension of the estimated (output) VPE vector 1130 may be the same dimension as the value of the input VPE vector 1110. In accordance with another example implementation the dimension of the estimated (output) VPE vector is smaller than the dimension of the input vector. For example, assume that the input vector consists of two values: the number of clients and the number of clients that failed to associate with an AP. Thus, the input VPE has a dimension of 2. In accordance with one of the example implementations, the estimated VPE may contain only the number of clients that failed to associate, thus the predicted VPE has a dimension of 1.

The current VPE and the estimated VPE serve as inputs to the subtraction module 1140. It should be noted that when the dimension of the VPE and estimated VPE are different, only the elements which are common to both vectors are utilized by the subtraction module 1140.

The output of the subtraction module 1140 is an error vector representing VPE prediction error as follows:

$$VPE_t\ \text{Error} = VPE_t - \text{Predicted } VPE_t \qquad \text{EQ. 3}$$

where:

$VPE_t$ Error—VPE prediction error $VPE_t$—vector of network elements at time t

Predicted $VPE_t$—predicted vector of network elements at time t

In this way, the VPE prediction error represents a difference between the predicted (expected) vector of network elements Predicted $VPE_t$, including MAX and MIN components, and the observed vector of network elements $VPE_t$. The VPE prediction error serves as an input into module 1150 that produces a vector that is a function of the VPE prediction error, which PACE 135 uses to drive the adaptation of the network events behavioral model 1120 (ML model 139 of FIG. 1) based on actual, observed network event data 139.

Figure 12A:
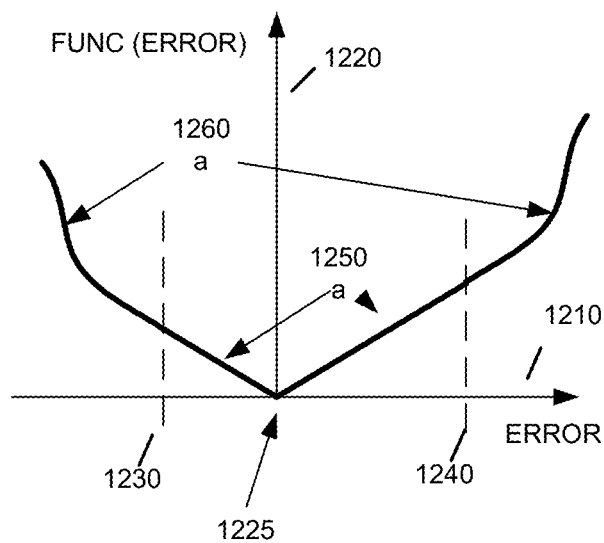
FIGS. 12A and 12B are graphs illustrating functions of VPE errors.
Figure 12B:
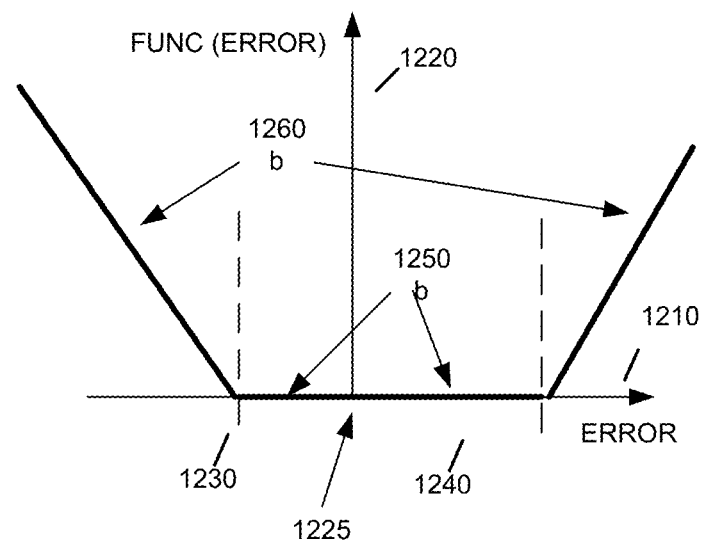

FIGS. 12A and 12B are graphs illustrating different functions of VPE errors. For sake of simplicity, only one dimension of the VPE error vector is describe. The x axis 1210 provides the VPE error. The function of the VPE error is provided on the y axis 1220. The origin of the x axis is at the point where the predicted VPE value equals VPE* for the corresponding time. The dynamic thresholds VPE Min 1230 and VPE Max 1240 are marked on the x axis, where the VPE Min is smaller than VPE* and the VPE Max is larger than VPE*.

As can be seen from FIG. 12A, when the VPE error is between the VPE Min and the VPE Max is obeys a first function 1250, and when the VPE error is either greater than VPE Max or smaller than VPE Min it obeys a second function 1260.

FIG. 12B illustrates a specific Rectified Linear Unit (ReLU) function. The figure uses the same x and y axis 1210 and 1220 as well as the same numerical notations for the VPE* 1225, VPE min 1230, and VPE Max 1240. The VPE error function is set to zero when the prediction error is:

$$VPE\ Min < VPE\ Error < VPE\ Max \qquad \text{EQ. 4}$$

And similarly, the VPE error function is set to a linear function of the VPE error when the VPE error is either greater than VPE Max or smaller than VPE Min. Equation 5 below illustrate one example of such function.

$$\text{Function}(VPE\ \text{Error}) = \begin{cases} VPE\ \text{Error} - VPE\ \text{Max if } VPE\ \text{error} > VPE\ \text{Max} \\ -VPE\ \text{Error} + VPE\ \text{Min if } VPE\ \text{error} < VPE\ \text{Min} \end{cases} \qquad \text{EQ. 5}$$

In either case, the function of the VPE error drives the adaptation of the parameters of the ML model 137 by PACE 135. In one specific example implementation, the system behavioral model represented by ML model 137 is an AI-driven model, such as Long short-term memory (LS™). Other implementation may utilize other AI and machine learning (ML) algorithms to adapt the parameters of the system behavioral model 1120 (ML model 137 of FIG. 1) as to minimize the predicted VPE error as network event data 139 is received and processed according to the techniques described herein.

In accordance with one example implementation, the parameters of the system behavioral model are continuously adapted based on new values of the counters streamed to NMS 136. In accordance with another example implementation, the process of creating the system behavioral model (adapting the parameters of the model based on the counters computed for historical time series of network event data) is performed periodically, e.g., once every two weeks, based on recorded network event data. Given the fact that, in some deployments, parameters within the system behavioral model (ML 137) may shift rather slowly, if at all, periodically updating the behavior model by PACE 135 may save computational resources and still provide proper representation of network system 100.

In some examples, to reduce the required computation resources, PACE 135 may use only a subset of the VPEs rather than the whole set.

In this way, PACE 135 constructs and adapts MML model 137 (the system behavioral model) to capture the normal operational ratios between the various network events. For example, the number of DNS failures with respect to the total number of clients and total number of failures and total number of successes. Specifically, in one aspect of the system behavioral model, PACE 135 updates the model such that the model learns a "normal" number of DNS failures expected for a given total number of clients as well as the total number of successes. More specifically, in general, NMS 138 and, in particular, event data 139 stores information about each individual network event, such as a failed attempt of a client such as attempt to roam, attempt to get authenticated, attempt to get IP address, etc. PACE 135 applies and adapts ML model 137 as described herein to train the model to accurately predict whether the network event data e.g., failed mobility, failed authentication, etc. represents a network event that is within a "normal" and, as such, expected behavior (i.e., expected transient failure due to current operating conditions) or whether one or more of these failures are abnormal and require further analysis and or mitigation by VNA 133.

System Behavioral Model Update and Validation Using an Error Histograms

In accordance with one specific implementation, PACE 135 of NMS 136 constructs the system behavioral model (ML model 137) based on event data 139 collected from multiple sites 102. Such a system behavioral model is referred to herein as a global system behavioral model. In accordance with one implementation, once this global model is constructed, its parameters are fixed and the VPE data that was used to construct it (or just a subset of the data) is run through the model, recording the prediction error. Similarly, in accordance with another implementation, PACE 135 records the value of the prediction error only when it is outside of the VPE is out of the dynamically determined range [VPE Min, VPE Max].

Figure 14:
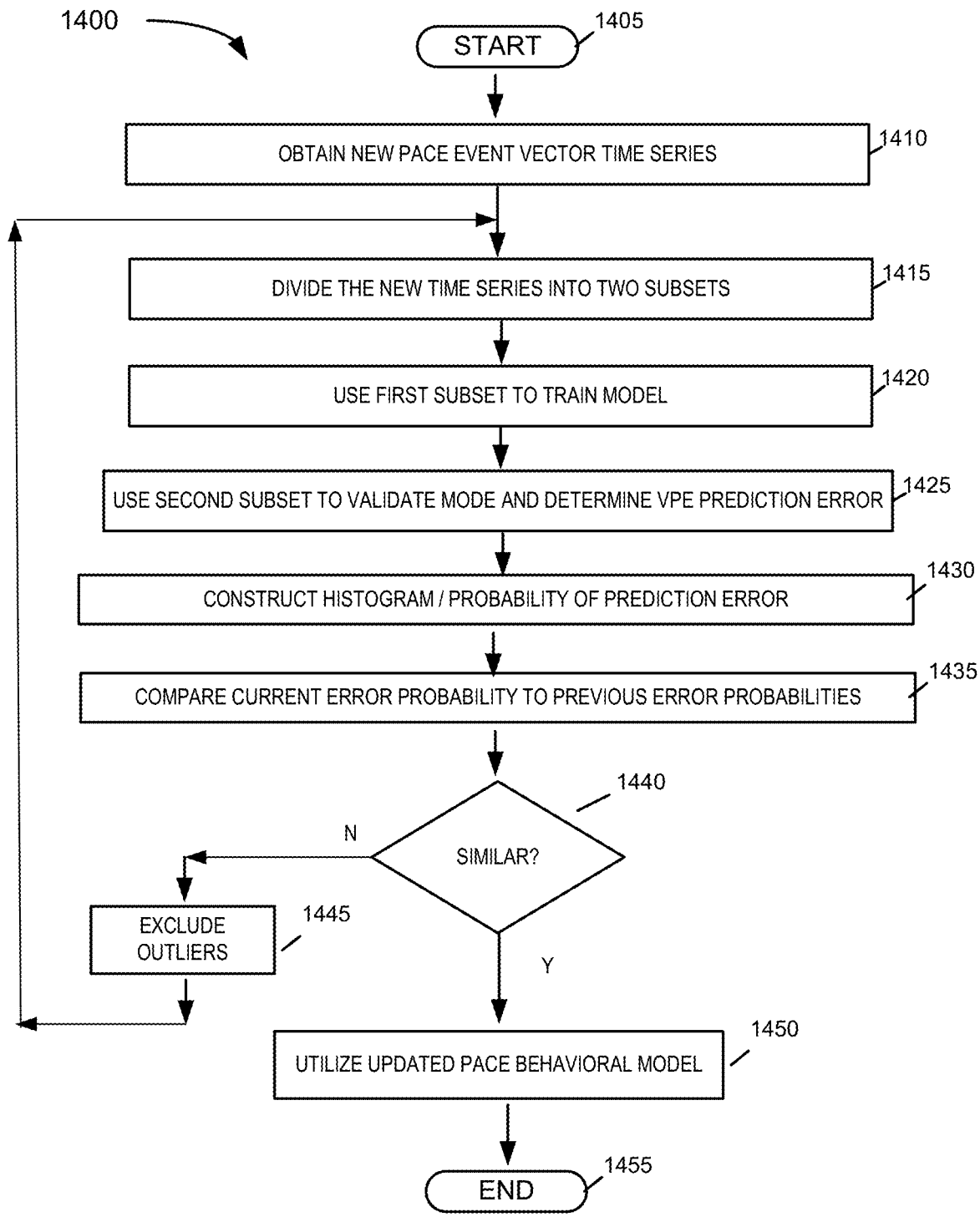
FIG. 14 illustrates a flowchart for constructing the network event behavioral model including ensuring that the model excludes abnormal behavior.

FIG. 14 is a flowchart 1400 illustrating an example process by which the proactive analytics and correlation engine (e.g., PACE 135 of FIG. 1) adaptively updates a network event ML-based behavioral model (e.g., ML model 137). For purposes of example, the example process will be described with respect to PACE 135 of FIG. 1.

In this example, PACE 135 begins at operation 1405 and proceeds to operation 1410 where PACE 135 receives or otherwise collects a new time series of network event data for the latest time period, e.g., for the last two weeks. At operation 1415, PACE 135 divides the information from the time series into two subsets based on timestamp, also referred to herein as time series subgroups, each subgroup having a different date/time range. PACE 135 uses a first subset, e.g., a first two thirds of the collected network event data, in operation 1420 to construct a PACE behavioral model (ML model 137) and uses the second subset, e.g., the remaining one third of the data, in operation 1425 to test the constructed behavioral model and to construct a prediction error histogram/probability function in operation 1430.

Figure 13:
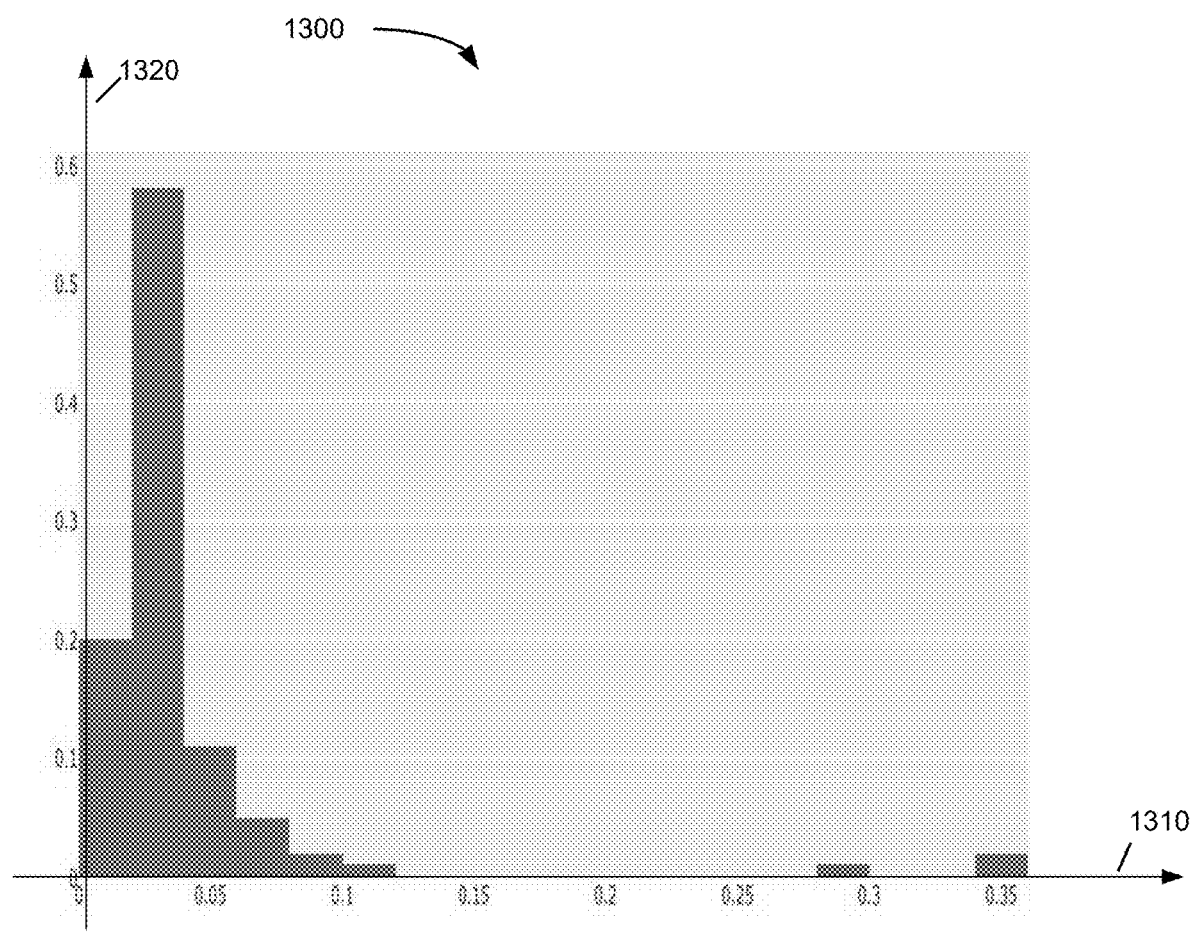
FIG. 13 shows an example of a histogram of a prediction error.

In some examples, PACE 135 generates and utilizes the prediction error probability function for at least two different technical benefits: a) ensuring that the network events that were used for constructing the PACE behavioral model were associated with normal behavior, and b) ensuring that the parameters tuned for the PACE behavioral model provide proper representation for the underlying behavior, including ratios, of the various network events. As explained in greater detail below, the validation process performed by PACE 135 utilizes histograms of the prediction errors such as the prediction error at the output of the subtraction module 1140. In accordance with yet another implementation, PACE 135 constructs the histogram based on the output of the function of the VPE errors module 1150. An example for such prediction error histogram is illustrated in FIG. 13. The x axis 1310 describes the prediction error (or in another specific implementation the amount by which the prediction is out of the dynamically determined range [VPE Min, VPE Max]). The y axis 1320 provides the probability in which the specific error value happened during the run across all the sites using the second subset of the network event data, e.g., the subset which is used for testing the validity of the PACE behavioral model. In accordance with one aspect of the invention, the fact that most of the errors are of a small value provides validation to a successful construction of the system model.

In operation 1435, PACE 135 compares the histogram/probability of VPE errors from the newly constructed model to the error histograms/probabilities obtained as part of previous behavioral model training. If in decision operation 1440 PACE 135 determines that the new error probability distribution/histogram is not similar to the previous error distributions (e.g., via using Kullback-Leibler divergence measurements as described below), PACE 135 proceeds to operation 1445 and excludes abnormal/outliers data points/events from the training data. In some examples, PACE 135 may generate output to inform a user, administrator or data scientist about the event to direct the user to exclude the abnormal/outlier data points. PACE 135 loops back to operation 1415 and repeats the training process using cleaned data which excludes the outlier events, thereby adaptively re-training ML model 137 as necessary based on real-time network event data.

Once PACE 135 determines that the new prediction error is similar to previous prediction error distribution functions (decision operation 1440), PACE 135 terminates the training process and proceeds to operation 1450 and begins using the newly constructed VPE behavioral model for processing subsequent event data. For example, when periodically the network event system behavioral model is refreshed e.g., every 2 weeks, the currently constructed histogram of the prediction errors is compared against the previous prediction errors such as the prediction error histogram from 2, 4, 6, etc. weeks ago. In accordance with yet another implementation, if the two histograms are highly similar or correlated, the new network events behavioral model is validated and the parameters of the newly constructed system are used. PACE 135 completes the retraining and new construction cycle in operation 1455.

In one specific implementation, PACE 135 performs the comparison of operation 1440 by determining the correlation between the past and histograms and the current prediction error. PACE 135 determines the histograms are sufficiently similar if the correlation is greater than a specific threshold, e.g., 0.8. In accordance with another example implementation the method utilizes information theory to determine the similarity between the histograms that represent the error probabilities. Specifically, the method employs the Kullback-Leibler divergence, (also called relative entropy or KLD), to determine a measure of how one probability distribution is different from a second, reference probability distribution based on past histograms.

Using the System Behavioral Model to identify Behavior Abnormalities

Figure 15:
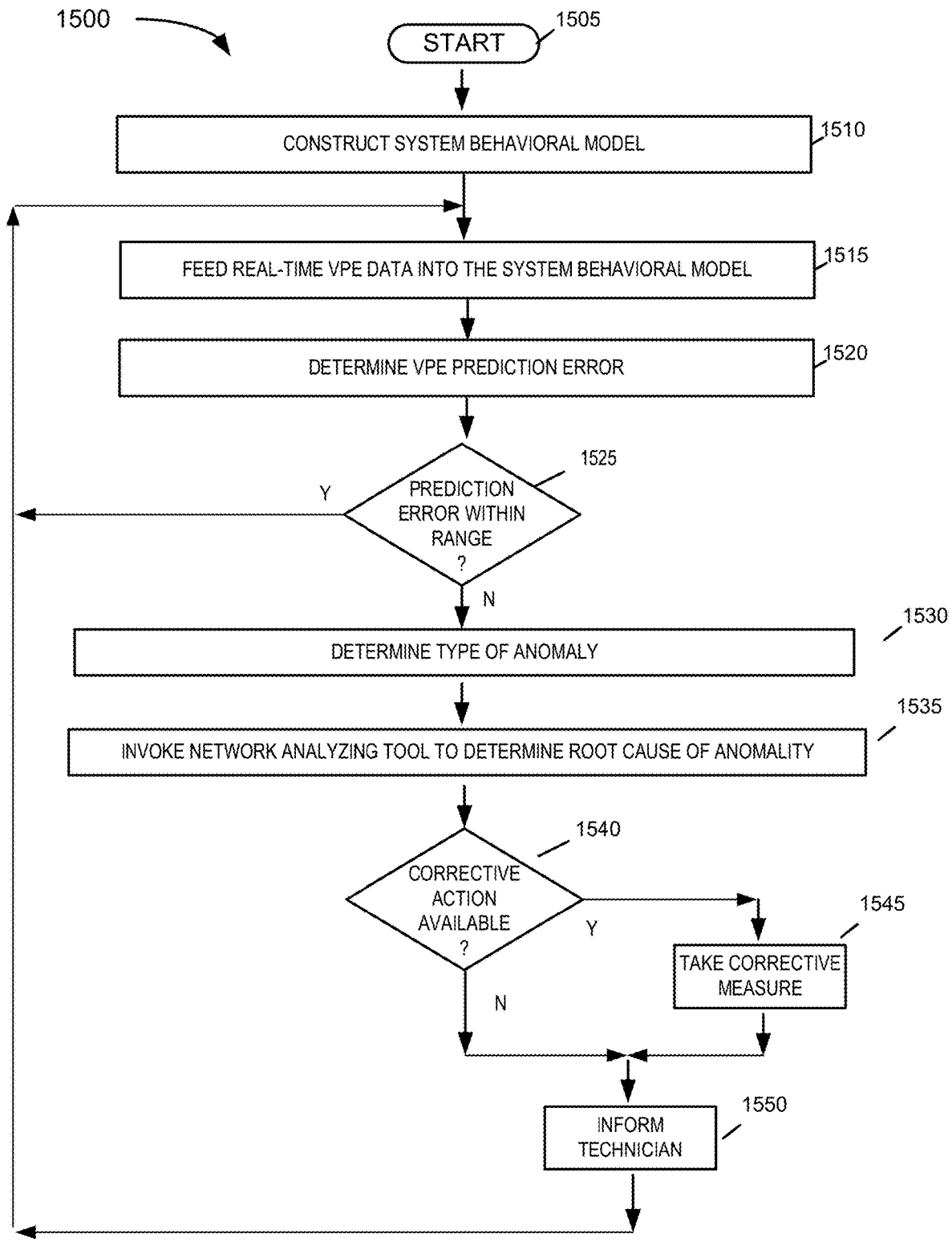
FIG. 15 illustrates a flowchart of a process triggered when a VPE prediction error is out of the dynamic boundaries segment.

FIG. 15 is a flowchart 1500 illustrating an example process executed by virtual network assistant 133 for performing root cause analysis of network event data as triggered by PACE 135, i.e., when PACE 135 applies ML model 137 and computes a VPE prediction error that is out of the dynamically determined range (boundaries) for one or more types of network events, thereby indicating that deeper analysis of the anomalous network behavior associated those network events need be performed. For purposes of example, the example process will be described with respect to VNA 133 and PACE 135 of FIG. 1.

In this example, PACE 135 of VNA 133 begins at operation 1505 and proceeds to operation 1510, where the system behavioral model is constructed and the parameters are fixed, as described herein. In operation 1515, PACE 135 feeds real-time VPE information (vectorized input generated from network event data 139) into ML model 137 and determines the VPE prediction error in step 1520. PACE 135 proceeds to decision operation 1525 and examines whether the VPE prediction error based on the predicted VPE generated by ML model 137 is within, for each parameter, the dynamically determined range [VPE Min, VPE Max].

If PACE 135 determines that the VPE prediction error falls within the dynamically determined range, PACE 135 loops back to operation 1515 and similarly processes any newly received network event data 139. In this way, as long as the prediction error is within the dynamically determined range, the behavior of the overall network system 100 is deemed to be normal despite the fact that various clients in the system may report failures, e.g., ARP failure, DHCP failure, or DNS failure. For example in a system with a large, e.g., 1000 clients, it is normal to experience a few, e.g., 1 or 2, failures such as those mentioned above.

However if the VPE prediction error is out of the predicted error dynamic range established by [VPE Min, VPE Max], PACE 135 determines that an abnormality in network behavior has been detected, i.e. the corresponding faults or other network events are occurring at a frequency that is outside the expected range. PACE 135 proceeds to operation 1530 and determines the type of the network event that exhibits abnormal behavior. For example, PACE 135 may use type information 640 of table 600 of FIG. 6 to identify the particular type of network event(s) exhibiting the behavior.

In operation 1535, in response to the identification of one or more anomalous network events by PACE 135, NMS 136 invokes virtual network assistant 133 to perform a deeper analysis of event data 139 to determine the root cause of the detected abnormality. In decision operation 1540, VNA 133 determines whether, based on the root cause analysis, a remedial action can be invoked, such as restarting or reconfiguring one or more APs 142, network nodes or other components or by outputting scripted actions for an administrator to follow. If a remedial corrective action is available, at operation 1545, VNA 133 invokes the remedial action such as restarting a specific device, a component of a device, a module of a device, etc. In either case, if a remedial action is available or not, VNA 133 proceeds to operation 1550 and outputs a report/alert to inform a technician about the identified issue and/or the corrective action taken by VNA 133 to automatically to remedy the underlying root cause of the issue. Upon invoking VNA 133, PACE 135 loops back to operation 1515 and continues to process real-time event data 139 received from network system 100.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems —Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system comprising:
   a plurality of access point (AP) devices in a wireless network; and
   a network management system comprising:
      a memory storing network event data received from the AP devices, wherein the network event data is indicative of operational behavior of the wireless network, and wherein the network event data defines a series of network events of one or more event types over a plurality of observation time periods; and
      one or more processors coupled to the memory and configured to:
         apply an unsupervised machine learning model to the network event data to dynamically determine, for a most recent one of the observation time periods: (i) predicted counts of occurrences of the network events for each event type of the one or more event types, and (ii) a minimum (MIN) threshold and a maximum (MAX) threshold for each event type of the one or more event types, wherein MIN thresholds and MAX thresholds define ranges of expected occurrences for the network events of the one or more event types; and
         identify, based on the MIN thresholds and the MAX thresholds and actual network event data for the most recent one of the observation time periods, one or more of the network events as indicative of abnormal network behavior,
      wherein the one or more processors are configured to, for each event type of the one or more event types:
         determine a prediction error indicative of a difference between the predicted counts of occurrences of the network events as generated by the unsupervised machine learning model and counts of actual network events of the actual network event data for a corresponding event type; and
         detect the abnormal network behavior when the prediction error is out of bounds of the MIN threshold and the MAX threshold for the corresponding event type.

2. The system of claim 1, wherein the unsupervised machine learning model has been trained using training data comprising network event data augmented with the MIN thresholds and the MAX thresholds dynamically determined, for the one or more event types, from the network event data for a plurality of overlapping time windows having different time origins.

3. The system of claim 1, wherein the processors are further configured to:
   trigger, by a machine learning-based virtual network assistant, root cause analysis of the network event data in response to identifying the one or more of the network events as indicative of the abnormal network behavior; and
   trigger a remedial action based on one or more identified root causes for the abnormal network behavior.

4. The system of claim 1, wherein the processors are further configured to adaptively compute the MIN thresholds and the MAX thresholds based on the network event data by:

for the series of network events, determining a plurality of time windows, each of the time windows having a different time origin;

for each of the time windows, counting a number of events in a given observation time period within the time window for each event type;

determining, for each event type and based on the counting, the MAX threshold as a largest number of occurrences of network events of the corresponding event type for any of the plurality of time windows; and determining, for each event type and based on the counting, the MIN threshold as a smallest number of occurrences of network events of the corresponding event type for any of the plurality of time windows.

5. A network management system that manages one or more access point (AP) devices in a wireless network, comprising:

a memory storing network event data received from the AP devices, wherein the network event data is indicative of operational behavior of the wireless network, and wherein the network event data defines a series of network events of one or more event types over a plurality of observation time periods; and one or more processors coupled to the memory and configured to:

apply an unsupervised machine learning model to the network event data to determine, for a most recent one of the observation time periods: (i) predicted counts of occurrences of the network events for each event type of the one or more event types, and (ii) a minimum (MIN) threshold and a maximum (MAX) threshold for each event type of the one or more event types, wherein MIN thresholds and MAX thresholds define ranges of expected occurrences for the network events of the one or more event types; and identify, based on the MIN thresholds and the MAX thresholds and actual network event data for the most recent one of the observation time periods, one or more of the network events as indicative of abnormal network behavior, wherein the one or more processors are configured to, for each event type of the one or more event types:

determine a prediction error indicative of a difference between the predicted counts of occurrences of the network events as generated by the unsupervised machine learning model and counts of actual network events of the actual network event data for a corresponding event type; and detect the abnormal network behavior when the prediction error is out of bounds of the MIN threshold and the MAX threshold for the corresponding event type.

6. A method comprising:

storing, by one or more processors of a network management system into a memory, network event data received from a plurality of access point (AP) devices in a wireless network, wherein the network event data is indicative of operational behavior of the wireless network, and wherein the network event data defines a series of network events of one or more event types over a plurality of observation time periods;

determining, for a most recent one of the observation time periods and based on applying an unsupervised machine learning model to the network event data: (i) predicted counts of occurrences of the network events for each event type of the one or more event types, and (ii) a minimum (MIN) threshold and a maximum (MAX) threshold for each event type of the one or more event types, wherein MIN thresholds and MAX thresholds define ranges of expected occurrences for the network events of the one or more event types; and identifying, based on the MIN thresholds and the MAX thresholds and actual network event data for the most recent one of the observation time periods, one or more of the network events as indicative of abnormal network behavior, wherein identifying the one or more of the network events as indicative of abnormal network behavior comprises, for each event type of the one or more event types:

determining a prediction error indicative of a difference between the predicted counts of occurrences of the network events as generated by the unsupervised machine learning model and counts of actual network events of the actual network event data for a corresponding event type; and detecting the abnormal network behavior when the prediction error is out of bounds of the MIN threshold and the MAX threshold for the corresponding event type.

7. The method of claim 6, wherein the unsupervised machine learning model has been trained using training data comprising network event data augmented with the MIN thresholds and the MAX thresholds dynamically determined, for the one or more event types, from the network event data for a plurality of overlapping time windows having different time origins.

8. The method of claim 6, further comprising:

triggering, by a machine learning-based virtual network assistant, root cause analysis of the network event data in response to identifying the one or more of the network events as indicative of the abnormal network behavior; and triggering a remedial action based on one or more identified root causes for the abnormal network behavior.

9. The method of claim 6, further comprising adaptively computing the MIN thresholds and the MAX thresholds based on the network event data, wherein the adaptively computing comprises:

for the series of network events, determining a plurality of time windows, each of the time windows having a different time origin;

for each of the time windows, counting a number of events in a given observation time period within the time window for each event type;

determining, for each event type and based on the counting, the MAX threshold as a largest number of occurrences of network events of the corresponding event type for any of the plurality of time windows; and determining, for each event type and based on the counting, the MIN threshold as a smallest number of occurrences of network events of the corresponding event type for any of the plurality of time windows.

\* \* \* \* \*